(12) United States Patent
Hamburgen

(10) Patent No.: US 12,233,635 B2
(45) Date of Patent: Feb. 25, 2025

(54) FIBER-REINFORCED FILMS

(71) Applicant: Google LLC, Mountain View, CA (US)

(72) Inventor: William Riis Hamburgen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 325 days.

(21) Appl. No.: 16/624,021

(22) PCT Filed: Dec. 20, 2018

(86) PCT No.: PCT/US2018/066768
§ 371 (c)(1),
(2) Date: Dec. 18, 2019

(87) PCT Pub. No.: WO2019/126481
PCT Pub. Date: Jun. 27, 2019

(65) Prior Publication Data
US 2020/0171784 A1 Jun. 4, 2020

Related U.S. Application Data

(60) Provisional application No. 62/608,251, filed on Dec. 20, 2017.

(51) Int. Cl.
*B32B 5/12* (2006.01)
*B32B 5/26* (2006.01)
(Continued)

(52) U.S. Cl.
CPC ................. *B32B 5/12* (2013.01); *B32B 5/26* (2013.01); *G06F 1/1643* (2013.01);
(Continued)

(58) Field of Classification Search
CPC ...... G09F 9/301; G06F 1/1643; G06F 1/1652; B32B 2260/021; B32B 5/12; B32B 2262/105; B32B 2262/106
See application file for complete search history.

(56) References Cited

U.S. PATENT DOCUMENTS

2004/0092183 A1* 5/2004 Geva .................. B32B 5/12
442/134
2005/0077431 A1 4/2005 Preston
(Continued)

FOREIGN PATENT DOCUMENTS

EP 1240452 A1 9/2002
EP 2793210 A1 10/2014
(Continued)

OTHER PUBLICATIONS

Aramid HPM (aramid.com/zylon-pbo/) accessed Oct. 6, 2021.*
(Continued)

*Primary Examiner* — Alicia J Weydemeyer
(74) *Attorney, Agent, or Firm* — Shumaker & Sieffert, P.A.

(57) ABSTRACT

An apparatus includes a first layer including unidirectional first fibers oriented in a first direction and embedded within the first layer, where the first layer has a thickness of less than 25 µm and a second layer bound to the first layer, the second layer including unidirectional second fibers oriented in a second direction and embedded within the second layer, where the first layer has a thickness of less than 25 µm and where the first direction is nonparallel to the second direction.

15 Claims, 22 Drawing Sheets

(51) Int. Cl.
    *G06F 1/16*           (2006.01)
    *G09F 9/30*           (2006.01)

(52) U.S. Cl.
    CPC ............ *G06F 1/1652* (2013.01); *G09F 9/301* (2013.01); *B32B 2260/021* (2013.01); *B32B 2262/105* (2013.01); *B32B 2262/106* (2013.01); *B32B 2307/546* (2013.01); *B32B 2307/732* (2013.01); *B32B 2457/206* (2013.01); *B32B 2457/208* (2013.01)

(56) References Cited

U.S. PATENT DOCUMENTS

| | | | |
|---|---|---|---|
| 2010/0213002 A1* | 8/2010 | Oboodi | B32B 5/22 181/290 |
| 2010/0293691 A1* | 11/2010 | Chabba | F41H 5/0457 2/2.5 |
| 2013/0337222 A1* | 12/2013 | Wilenski | D01F 6/00 428/113 |
| 2015/0174854 A1* | 6/2015 | Siahaan | B32B 3/04 428/212 |
| 2015/0210588 A1 | 7/2015 | Chang et al. | |
| 2015/0378391 A1* | 12/2015 | Huitema | H05K 1/183 361/679.03 |
| 2016/0014919 A1* | 1/2016 | Huitema | H05K 5/0017 313/511 |
| 2016/0187935 A1 | 6/2016 | Tazbaz et al. | |
| 2017/0034918 A1 | 2/2017 | Huitema et al. | |

FOREIGN PATENT DOCUMENTS

| | | |
|---|---|---|
| EP | 3232425 A1 | 10/2017 |
| WO | 9411185 A1 | 5/1994 |
| WO | 2012167204 A2 | 12/2012 |
| WO | WO-2014166859 A1 * | 10/2014 ................ C08J 5/24 |

OTHER PUBLICATIONS

Hexcel Aramid Fiber Reinforcements (hexcel.com/products) accessed Oct. 6, 2021.*

International Search Report and Written Opinion for International Application No. PCT/US2018/066768, mailed Mar. 21, 2019, 19 pages.

* cited by examiner

FIBER-REINFORCED FILMS

CROSS-REFERENCE TO RELATED APPLICATIONS

This application is a 35 U.S.C. § 371 National Phase Entry Application from PCT/US2018/066768, filed on Dec. 20, 2018, and designating the U.S., which claims priority to U.S. Provisional Patent Application No. 62/608,251, filed on Dec. 20, 2017, entitled "MONOLAYER FIBER-REINFORCED FILMS", the disclosures of which are incorporated by reference herein in their entireties.

TECHNICAL FIELD

This description relates to thin film materials and, in particular, to monolayer fiber-reinforced films.

BACKGROUND

Modern computing devices often attempt to achieve a balance between portability and functionality. A tension can exist between having a display that provides for a rich display of information on a single surface, which suggests a relatively large form factor of the device to accommodate a relatively large display, and a device that is small enough to be easily carried and accessed by a user, which suggests a relatively small form factor of the device.

A potential solution to address this dilemma is to use a foldable flexible display in the computing device, so that in the display's folded configuration, the computing device has a relatively small form factor, and in the display's unfolded configuration, the computing device can have a relatively large display. To keep the form factor of the computing device small and slim, it is desirable to have relatively thin displays. However, folding a relatively thin display can result in small radius bends at the fold in the display, which may be detrimental to sensitive components of the display, for example, thin film transistors (TFTs), organic light-emitting diodes (OLEDs), thin-film encapsulation (TFE) and the like. In addition, thin displays can be relatively fragile and in need of protection against breakage.

Accordingly, relatively thin, foldable displays that nevertheless can be bent in a small radius, but not beyond a minimum radius, and that are relatively study, are desirable for use in computing devices.

SUMMARY

In a general aspect, an apparatus includes a first layer including unidirectional first fibers oriented in a first direction and embedded within the first layer, where the first layer has a thickness of less than 25 µm and a second layer bound to the first layer, the second layer including unidirectional second fibers oriented in a second direction and embedded within the second layer, where the first layer has a thickness of less than 25 µm and where the first direction is nonparallel to the second direction.

Implementations can include one or more of the following features, alone or in any combinations with each other. For example, the direction of the first fibers can be substantially perpendicular to the direction of the second fibers. The first fibers and the second fibers can have cross-sections that are substantially circular. The diameters of the first fibers and of the second fibers can be less than about 12 µm. An average spacing between adjacent unidirectional first fibers can be greater than two times the diameter of the first fibers. An average spacing between adjacent unidirectional first fibers can be greater than fives times the diameter of the first fibers.

The apparatus can further include a third layer bound to the second layer, the third layer including unidirectional third fibers embedded within the third layer, where the third layer has a thickness of less than 25 µm and where a direction of the third fibers is nonparallel to a direction of the second fibers. The second layer can be between the first and third layers. The direction of the third fibers can be substantially parallel to the direction of the first fibers.

In another aspect, a computing device can include a foldable display, a bend limit layer coupled to the foldable display, the bend limit layer configured to increase its stiffness non-linearly when the foldable display is bent to a radius of curvature less than a limit radius, the limit radius being less than 10 mm, and a backing film coupled to the foldable display, the backing film including a first layer including unidirectional first fibers oriented in a first direction and embedded within the first layer, where the first layer has a thickness of less than 25 µm and a second layer bound to the first layer, the second layer including unidirectional second fibers oriented in a second direction and embedded within the second layer, where the first layer has a thickness of less than 25 µm, where the first direction is nonparallel to the second direction.

The computing device of claim 10, where the bend limit layer includes a plurality of segments that are attached to a film and that are physically separated from each other when the radius of curvature of the foldable display is greater than the limit radius and that are in physical contact with neighboring segments when the radius of curvature of the foldable display less than or equal to the limit radius.

Implementations can include one or more of the following features, alone or in any combinations with each other. For example, the bend limit layer can include a plurality low stretch fibers, where the fibers are arranged in the bend limit layer, such that when the radius of curvature of the foldable display is greater than the limit radius, the distance between ends of each fiber in a plane of the bend limit layer is less than the length of the fiber, and such that when the radius of curvature of the foldable display is less than or equal to the limit radius, the distance between ends of each fiber in a plane of the bend limit layer is approximately equal to the length of the fiber. The bend limit layer can include a material whose stiffness changes non-linearly in response to a strain in the material exceeding a threshold value. The unidirectional first fibers can include a ceramic material. The foldable display can includes an OLED layer, the OLED layer having a first coefficient of thermal expansion, where a weighted average coefficient of thermal expansion of the unidirectional first fibers in the first layer is within 25% of the first coefficient of thermal expansion. The unidirectional first fibers in the first layer can include fibers of different materials, the different materials having different coefficients of thermal expansion. The first fibers in the first layer can include ceramic fibers and include carbon fibers. The weighted average coefficient of thermal expansion of the unidirectional first fibers in the first layer can be greater than 7 ppm per Kelvin.

DETAILED DESCRIPTION

Figure 1:
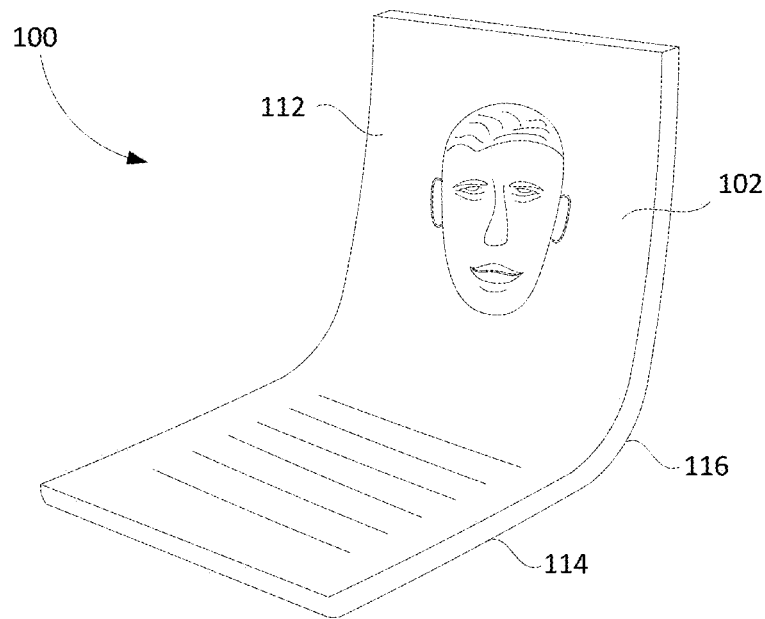
FIG. 1 is a perspective view of a computing device that includes a foldable display 102 with the foldable display in a partially folded configuration.
Figure 2:
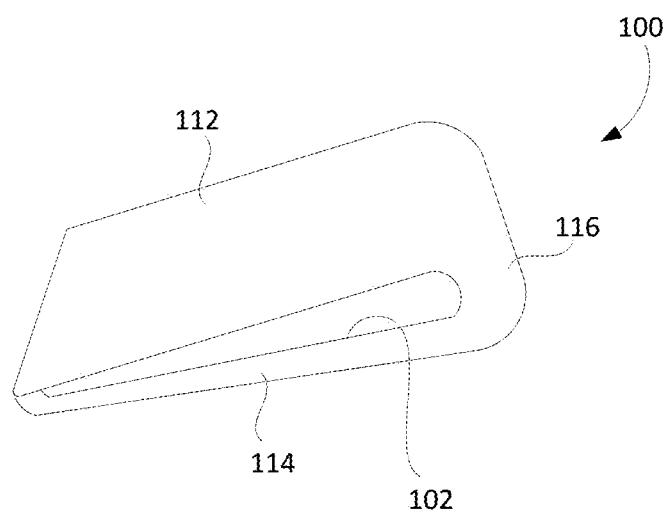
FIG. 2 is a perspective view of the computing device, with the display in a folded configuration.

FIG. 1 is a perspective view of a computing device 100 that includes a foldable display 102, with the foldable display in a partially folded configuration. The device 100 has the foldable display 102 mounted so that it folds with the viewable face inward. It is also possible to mount the foldable display 102 on the opposite side of device 100 so that the display folds with viewable face outward (not shown). FIG. 2 is a perspective view of the computing device 100, with the display 102 in a folded configuration. The foldable display 102 may be, for example, a TFT (Thin-Film-Transistor) OLED (Organic Light Emitting Diode) display, or other appropriate display technology. The foldable display 102 may comprise appropriate circuitry for driving the display to present graphical and other information to a user.

As shown in FIG. 1 and FIG. 2, the foldable display 102 can include a first flat rigid section 112, a second flat rigid section 114, and a third bendable section 116. In some implementations, the foldable display 102 can include more than two flat rigid sections 112, 114 and more than one bendable section 116. In some implementations, the foldable display 102 can include zero, or only one, flat rigid section 112, 114. For example, when a foldable display 102 includes zero flat rigid sections, the display 102 can be continuously bendable, and can be rolled up, as in a scroll. The foldable display 102 shown in FIG. 1 and FIG. 2 has a bendable section 116 that allows the foldable display to bend about an axis. In other implementations, the foldable display 102 can include bendable sections that allow the display 102 to bend about more than one axis.

The bendable section 116 of the foldable display 102 allows the display 102 to bend in an arc that has a radius, and the bendable section can be made to become rigid when the radius of the bendable section reaches a specified minimum radius. This minimum radius may be selected to prevent the display from bending in a radius so small that fragile components of the display would be broken. In some implementations, the minimum radius is greater than or equal to 2.5 millimeters, or greater than or equal to 3.0 millimeters, or greater than or equal to 5 millimeters. Thus, the bendable section can be flexible when bent in a radius greater than the minimum radius and then become rigid when the bend radius is equal to or smaller than the minimum radius.

Figure 3:
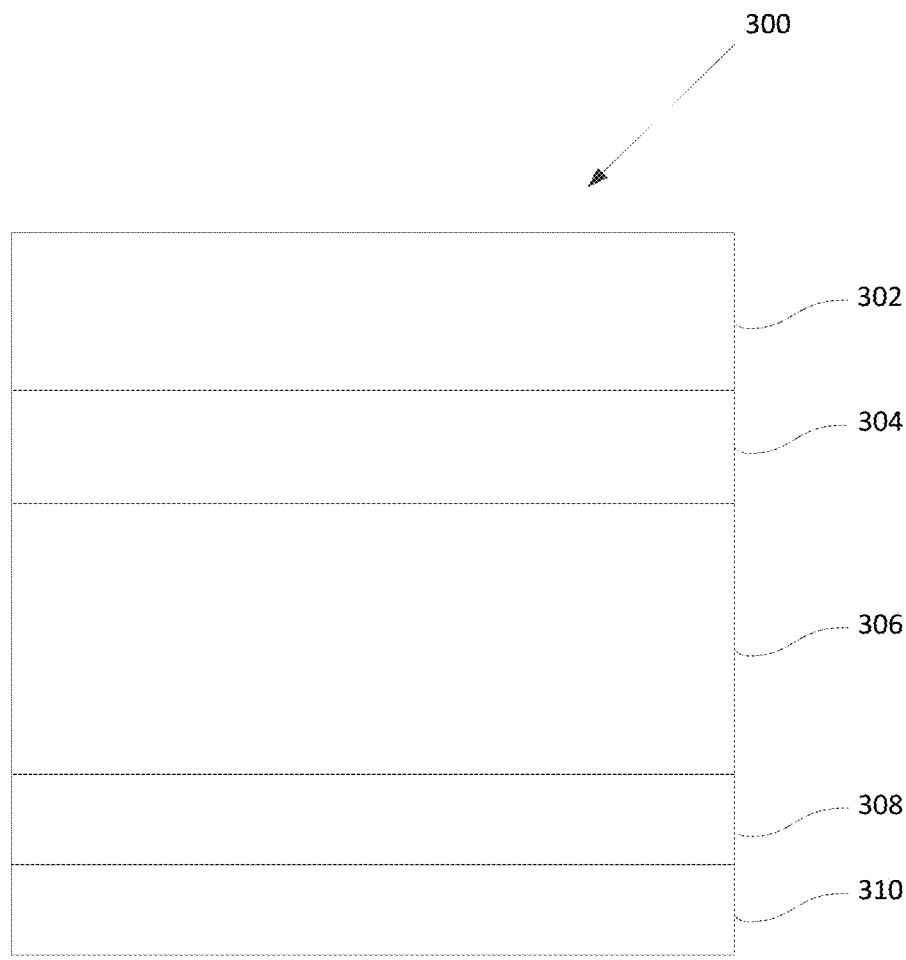
FIG. 3 is a schematic diagram of a flexible display device having a stack of a number of different layers.

FIG. 3 is a schematic diagram of a flexible display device 300 having a stack of a number of different layers. For example, in some implementations, a flexible organic light-emitting diode (OLED) layer 306 can be supported by a bend limit layer 308, and a backing film 310. In some implementations, the bend limit layer 308 can be between the OLED layer 306 and the backing film 310. In some implementations, the OLED layer 306 can be between the bend limit layer 308 and the backing film 310 An optically clear adhesive layer 304 can be applied to a front surface of the flexible OLED layer 306. A cover window film 302 can be applied to the optically clear adhesive layer 304 to protect the device on the front side. As the thickness of each layer of the stack is important to the overall thickness of the device 300, it is desirable to have a relatively thin thickness for the layers. For example, in some non-limiting examples, the thickness of the flexible OLED layer 306 can be on the order of approximately 300 μm; the thickness of the optically clear adhesive layer 304 can be on the order of approximately 100 μm; and the thickness of the cover window film can be on the order of approximately 200 μm. Thus, the thicknesses of the bend limit layer 308 and the backing film 310 are selected so as to maintain an overall thickness of the device 300 that is not too great, and also should have individual thicknesses that are fractions of a millimeter.

The components of the stack of the device 300 have different as-fabricated properties, including stresses and strains that exist in the component when the layer is fabricated. Additional stresses and strains can be induced in the layers of the stack when the display is bent into a configuration that is different from the configuration in which the layer was fabricated. For example, if the layer was flat when it was fabricated, then additional strain can be induced by bending the layer, and if the layer was fabricated in a curved configuration, then additional strain can be induced by flattening the layer. If the bend-induced strain exceeds a threshold value characteristic of a component of the stack, the component can be damaged by the strain due to plastic deformation, cracking, buckling, delamination, etc. This characteristic damage threshold strain may be different depending on temperature, humidity, required cycle life, and other use and environmental factors. Brittle inorganic layers of the stack can typically withstand less strain than inorganic layers before they are damaged by the strain. Nevertheless, organic materials in the stack also can be damaged by excessive strain that is induced by bending.

Figure 4:
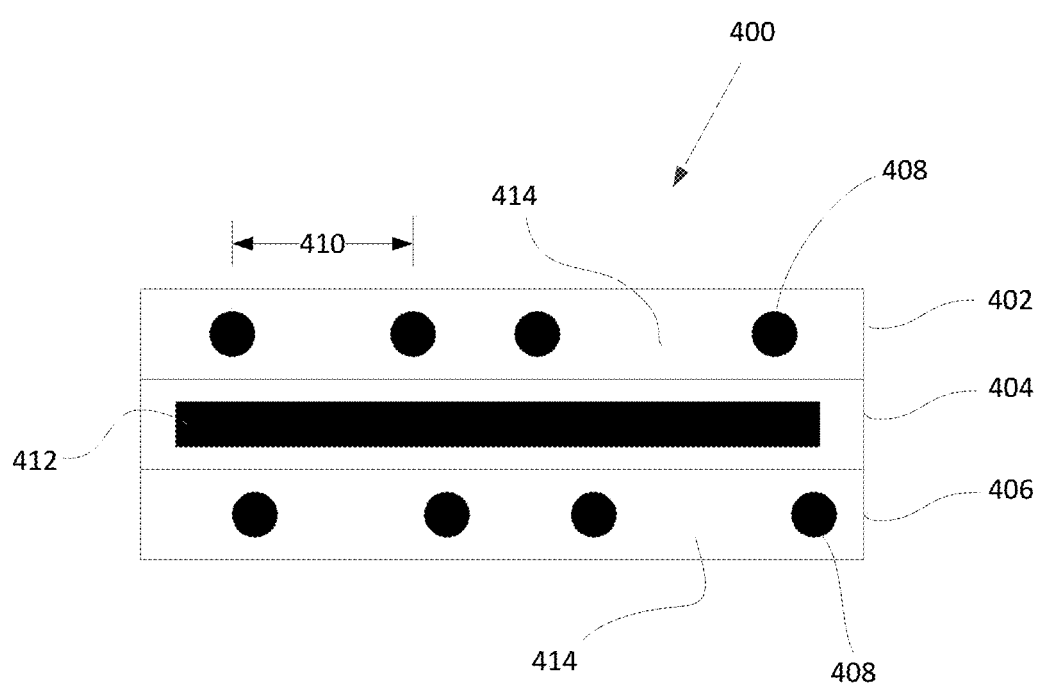
FIG. 4 is a schematic side view of a multilayer laminate comprised of fiber reinforced film.

FIG. 4 is a schematic side view of a fiber reinforced film 400. In one implementation, the fiber reinforced film 400 can be used as the backing film in a flexible display. However, the fiber reinforced film 400 also can be used in many other implementations, such as providing thin, strong structures. As shown in FIG. 4, in some implementations, the fiber reinforced film 400 can include a plurality of layers 402, 404, 406 stacked on top of each other as sheets. However, in other implementations, the fiber reinforced film 400 may include only a single layer.

The layers 402, 404, 406 of the fiber reinforced film 400 can include strong elongated fibers 408 that run along the length of the layer and that are embedded in a matrix of polymer material 414. For example, as shown in FIG. 4, circular cross-sections of four elongated fibers that extend into the page in each of the layers 402 and 406 are depicted, and a side view of one fiber 412 within layer 404, which extends across the layer 404 in a direction perpendicular to the fibers 408 in layers 402 and 406 is depicted. The fiber reinforced film 400 can be composed of one or more different layers that include unidirectional fibers, where directions of the unidirectional fibers of the different layers are selected depending on the application for which the film 400 will be used. For example, a layer 402, 404, 406 reinforced with unidirectional fibers generally requires greater force to bend in a direction that requires the fibers themselves to stretch or shrink in length, while relatively less force is required to bend the layer along an axis parallel to the direction of the unidirectional fibers. In addition, the density of fibers within a layer affects the strength and stiffness of the layer, where a higher density of fibers generally results in a higher strength and higher stiffness layer. The location of a layer within the stack also affects the force required to bend the film, with layers near the surface generally requiring more force to bend than layers near the center of the stack.

The thickness of each layer 402, 404, 406 can be less than about 50 μm in some implementations. In some implementations, the thickness of each layer 402, 404, 406 can be less than about 40 μm. In some implementations, the thickness of each layer 402, 404, 406 can be less than about 30 μm. In some implementations, the thickness of each layer 402, 404, 406 can be less than about 25 μm. In some implementations, the thickness of each layer 402, 404, 406 can be less than about 20 μm. In some implementations, the height of each fiber 408 in a direction normal to the plane of its layer 402 (e.g., the diameter of a fiber having a circular cross-section) can be less than 30 μm. In some implementations, the height of each fiber 408 in a direction normal to the plane of its layer 402 (e.g., the diameter of a fiber having a circular cross-section) can be less than 20 μm. In some implementations, the height of each fiber 408 in a direction normal to the plane of its layer 402 (e.g., the diameter of a fiber having a circular cross-section) can be less than 12 μm. In some implementations, the height of each fiber 408 in a direction normal to the plane of its layer 402 (e.g., the diameter of a fiber having a circular cross-section) can be less than 8 μm.

Figure 5:
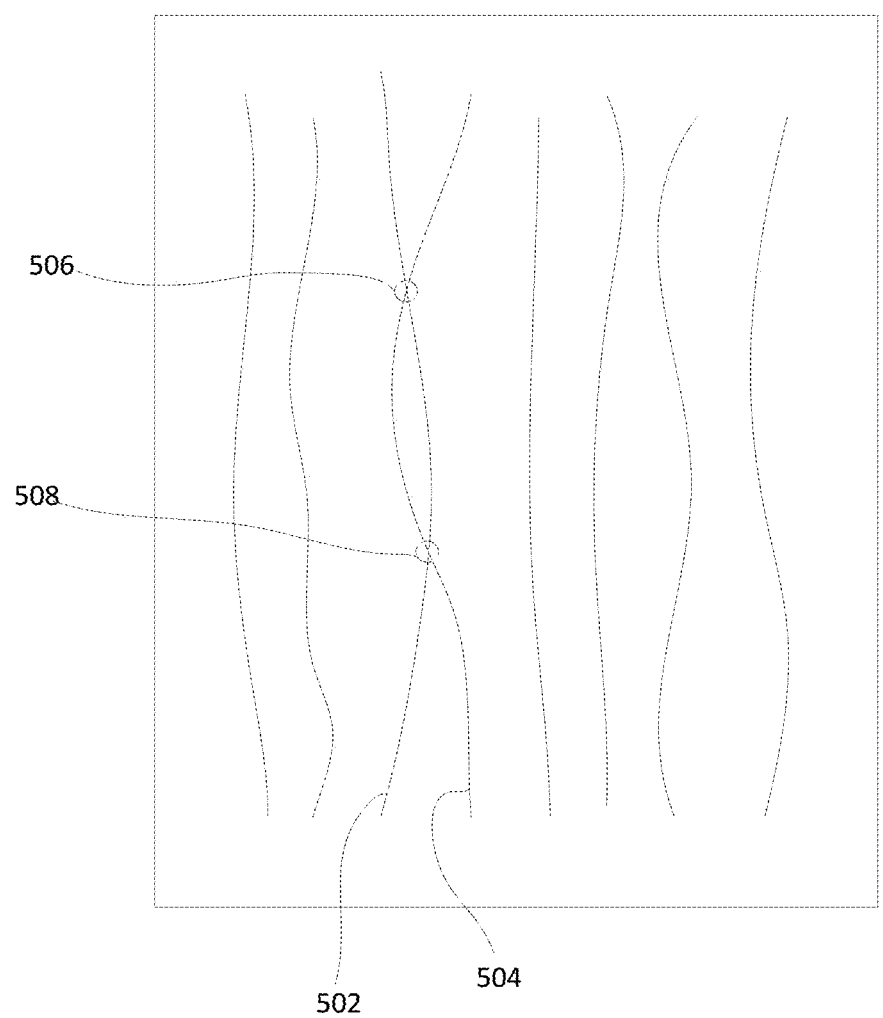
FIG. 5 is a schematic view of a layer of a unidirectional fiber reinforced film, viewed from a direction normal to the plane of a layer.

To achieve a thin fiber reinforced film 400, the layers 402, 404, 406 of the fiber reinforced film 400 can be created such that each layer includes essentially a monolayer of fibers 408. That is, individual fibers 408 within a layer 402 can be spaced apart from each other within the layer 402, such that different individual fibers 408 generally do not overlap with each other in a direction normal to the plane of the layer 402. Although it is desirable to have each of the fibers 408 within a layer 402 perfectly parallel to other fibers within the layer and equally spaced from each other, and in most cases, closely spaced to each other to maximize strength, for thin sheets with small-diameter fibers. limitations in manufacturing techniques may result in a few fibers that overlap each other in a direction normal to the plane of the layer 402. For example, FIG. 5 is a schematic view of a layer 500 of a unidirectional fiber reinforced film, viewed from a direction normal to the plane of the layer. As shown in FIG. 5, two fibers 502, 504 cross each other such that they overlap at locations 506, 508, causing the local thickness of the layer at locations 506, 508 to be greater than at other locations within the layer.

To reduce the probability of such overlapping fibers, an average lateral spacing 410 between adjacent fibers can be maintained at a sufficiently large distance. For example, in some implementations, the average lateral spacing 410 can be greater than two times the height of each fiber 408 in a direction normal to the plane of its layer 402 (e.g., the diameter of a fiber having a circular cross-section). In some implementations, the average lateral spacing 410 can be greater than five times the height of each fiber 408 in a direction normal to the plane of its layer 402.

The fibers 408 can be made from a variety of different materials. For example, the fibers 408 can be made of carbon, ceramic, polymer, glass, or metal materials. In some implementations, different layers 402, 404, 406 of the film 400 can include fibers of different materials. For example, the fibers within layer 402 could be made of ceramic material, while the fibers within layer 404 could be made of carbon material. In some implementations, an individual layer could include a mix of fibers made of different materials. The fiber material used in particular layer can be selected based on its material properties (e.g., thermal, electrical, mechanical properties) as they may be best suited for a particular application of the film 400.

Figure 6A:
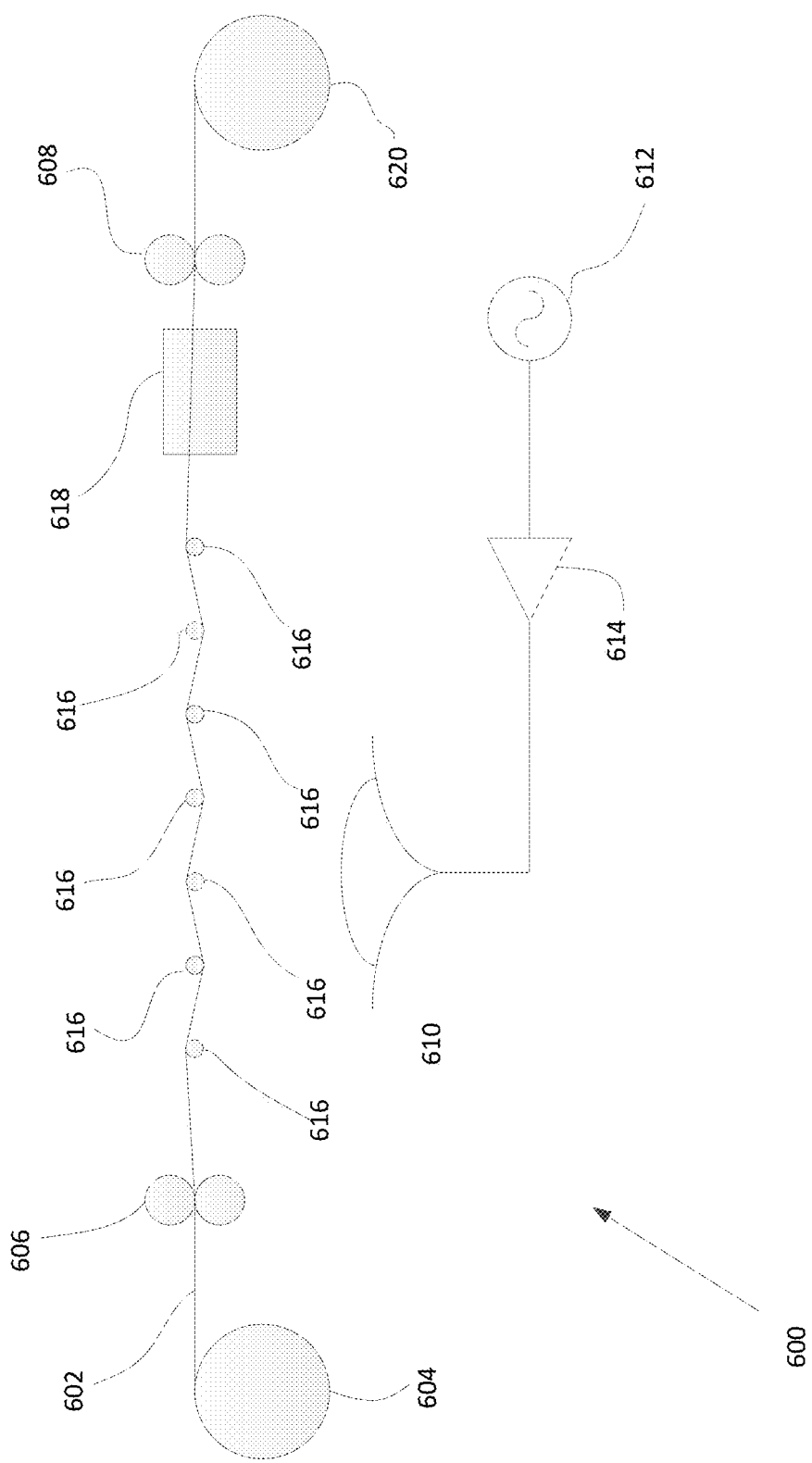
FIG. 6A is a schematic diagram of a spreader system configured for spreading a tow of many individual fibers into an array of laterally separated fibers.

The pattern of the spread fibers 408 in the layers 402, 406, 408 can be made in a number of different ways. For example, FIG. 6A is a schematic diagram of a spreader system 600 that is configured for spreading a fiber tow 602 of many individual fibers into an array of laterally separated fibers. The fiber tow 602 can be a yarn that includes many (e.g., tens, hundreds, or thousands of) individual fibers that are bundled together into the tow. The fiber tow 602 can be unwound from a spool 604 by a pair of rollers 606. The tension on the fiber tow 602 can be maintained by the rollers 606 and a second pair of rollers 608 that is located between the first pair of rollers 606 and a take-up drum 620. With the use of the two pairs of rollers 606, 608 the tension on the tow 602 as it moves through the spreader system between the two rollers can be maintained at a predetermined level regardless of the tension of the tow in the spool 604.

Figure 6B:
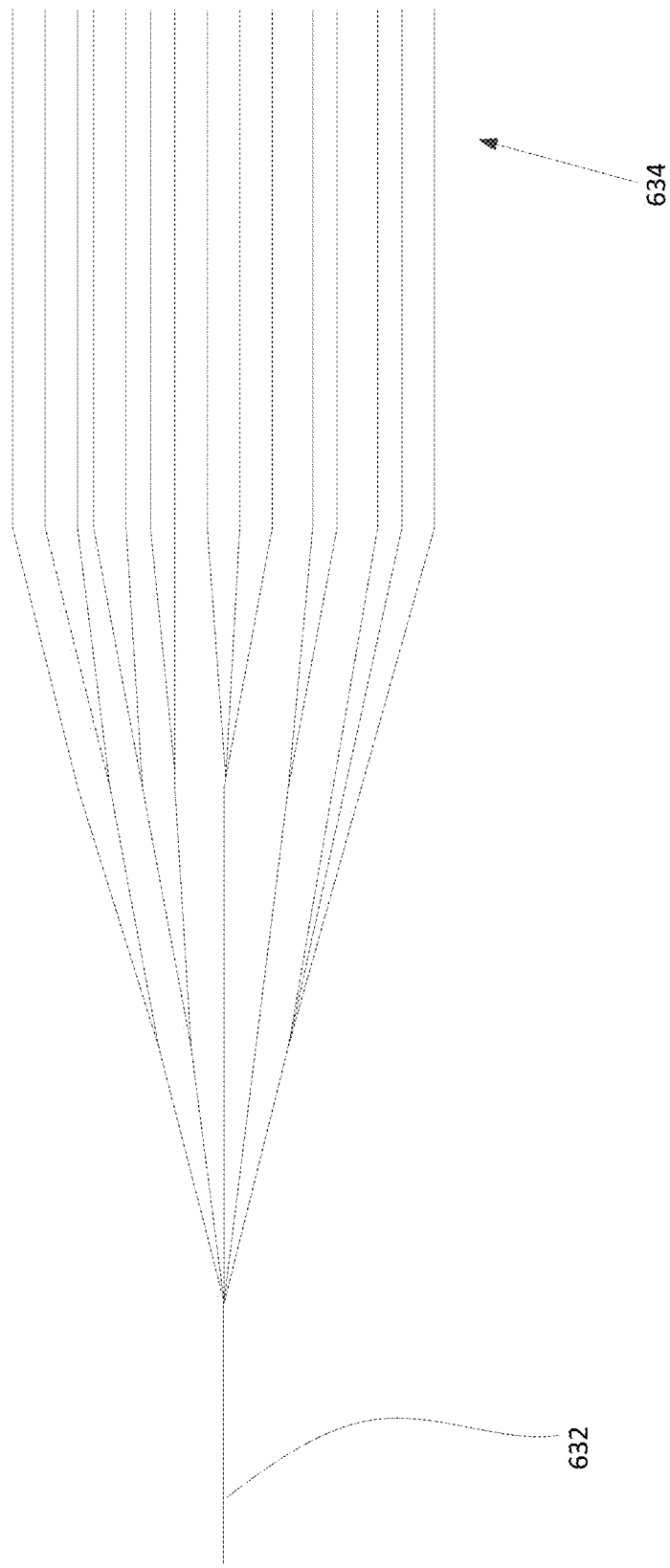
FIG. 6B is a schematic top view of a tow of fibers that is spread into laterally-spaced individual fibers as the tow moves through a spreading system.

The spreader system 600 can include an acoustic speaker 610 that is powered by an oscillator 612 and an amplifier 614, and acoustic energy output from the speaker 610 can spread individual fibers of the tow 602. The tow 602 can be routed over and under a series of polished rods 616 that are located adjacent to the speaker 610. As the tow 602 moves from the first pair of rollers 606 to the second set of rollers 608 through the series of polished rollers 616, pressure differences in the air through which the tow moves due to the speaker 610 can cause the tow 602 to spread into individual, laterally-spaced fibers. The polished rods 616 hold the spreading tow in its spread form as it is conveyed from the first pair of rollers 606 to the second set of rollers 608. The polished rods 616 can be driven by a motor to rotate synchronously with the movement of the fiber tow 602. FIG. 6B is a schematic top view of a tow of fibers 632 that is spread into laterally-spaced individual fibers 634 as the tow moves through the spreading system 600.

The spreading system 600 can include a polymerization station 618 in which the laterally-spaced individual fibers 634 of the tow 632 are polymerized to form a layer having a monolayer of fibers. The fibers can be polymerized in the polymerization station 618 in different ways. For example, polymer material can be sprayed onto the fibers to embed the fibers in the polymer material. In another embodiment, the fibers can be drawn onto a flat surface that is prepared to have a low adhesion to polymer material, and then polymer material can be wetted onto the surface. Once the polymer material has fully or partially cured it can be released from the surface with the fibers embedded in the polymer material.

In another implementation, and individual fiber or a spread tow of a plurality of fibers can be wound onto a mandrel to form a pattern of parallel fibers on the mandrel and the fibers on the mandrel can be polymerized to form a monolayer fiber-reinforced tube on the mandrel. When a plurality of fibers are wound onto the tube, the spacing between adjacent fibers in the tow can be maintained at a predetermined fixed distance, and during the winding, the tow can be moved continuously along the length of the mandrel at a constant speed by the predetermined fixed distance or slightly less than the predetermined distance, so that the fibers do not overlap. Once the polymer material has fully or partially cured, it can be released from the mandrel with the fibers embedded in the material. For example, the polymerized monolayer fiber-reinforced tube can be cut along the length of the tube and then peeled off the mandrel as sheet of material.

In another implementation, oriented chopped fibers can be used to create a fiber-reinforced film. As used herein, chopped fibers are fibers having a median length that is shorter than 5 mm. Chopped fibers can be created in a variety of different ways, for example, by creating long strands of fibers that are then cut, or chopped, to a desired length, or by recycling existing cured materials containing fibers to remove the fibers from the resin in which they are embedded and then cutting the fibers into smaller length pieces.

Figure 7:
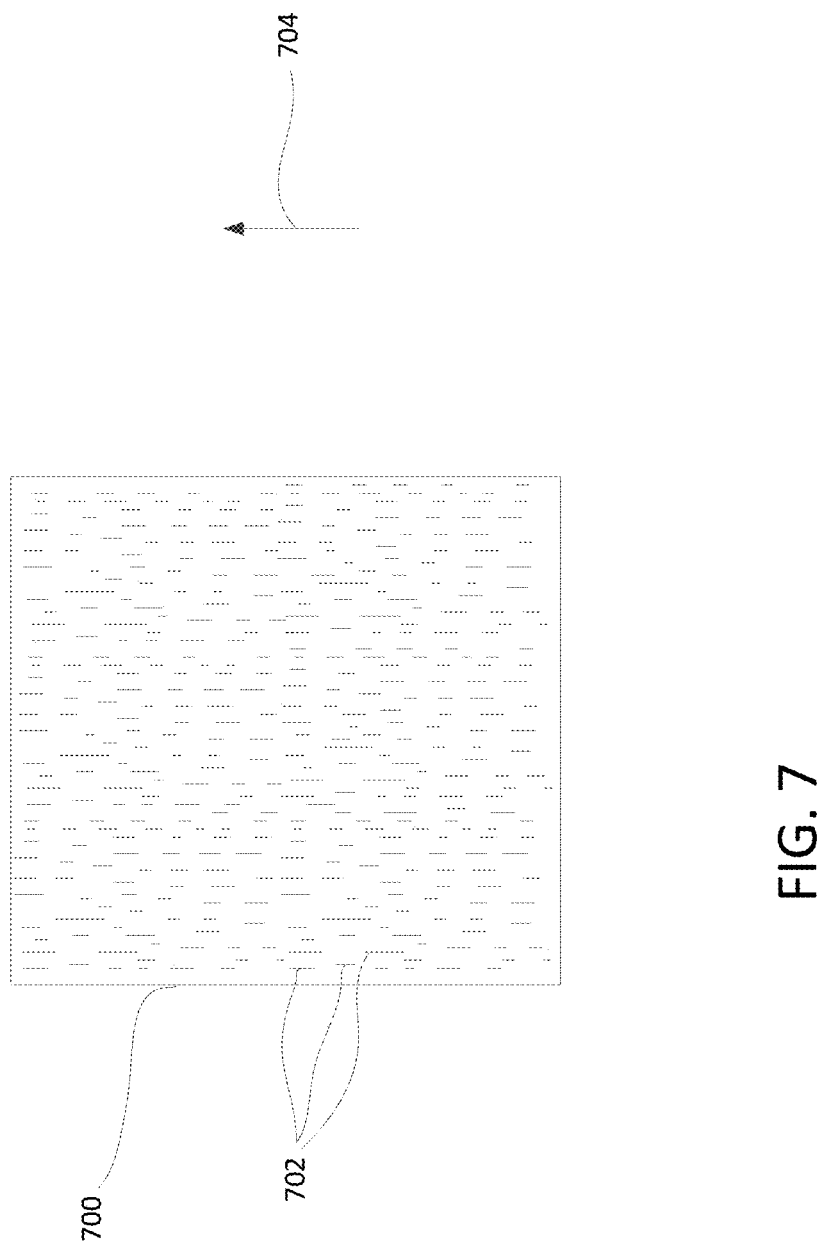
FIG. 7 is a schematic top view of a layer of a fiber reinforced film, in which the fibers include relatively short chopped fibers.

FIG. 7 is a schematic top view of a layer of a fiber reinforced film 700, in which the fibers include relatively short chopped fibers 702. The chopped fibers 702 can be generally shorter than the elongated fibers 408 shown in FIG. 4. On average, the chopped fibers 702 can be generally oriented along a preferred direction 704 in the in the layer, although the orientation of individual chopped fibers may deviate from the general preferred direction. Some chopped fibers 702 may overlap (e.g., cross) other chopped fibers. In some implementations the fiber reinforced film can include a plurality of individual layers stacked on top of each other. The preferred directions in which chopped fibers 702 are generally oriented in the different layers can be different. For example, in one implementation, adjacent layers in the film 700 can include chopped fibers whose preferred orientation directions are perpendicular to each other.

The individual chopped fibers 702 can be aligned along the preferred direction 704 with a number of techniques, for example, as described in "Aligned Discontinuous Fibre Composites: A Short History," Matthew, Such, Carwyn Ward, and Kevin Potter, *J. Multifunctional Composites*, vol. 3, pp 155-168 (2014), and in U.S. Pat. No. 6,025,285, both of which are incorporated herein by reference in their entirety. For example, in some implementations, individual fibers can be aligned along the preferred direction 704 by suspending fibers in a carrier fluid that is pumped through a tapered nozzle onto a substrate (e.g., a flat gauze bed, a centrifuge wall, etc.). When passed through the tapered nozzle, the chopped fibers can become aligned along a direction parallel to the axial direction of the nozzle, and this direction can be maintained when the fibers are deposited on the substrate. After deposition on the substrate, the carrier fluid can be removed, and then aligned fibers can be polymerized to form a film of fiber-reinforced material. In another implementation, short length fibers can be chopped from a long strand fiber immediately prior to deposition of the chopped fibers on a moving conveyor belt. The chopped fibers can maintain the direction of the long strand when they are deposited on the belt, and then the deposited fibers can be polymerized to form a film of fiber-reinforced material. Electric, optical, and acoustic fields also can be used to align the fibers. For example, a non-zero charge can be applied to the chopped fibers and then as they are deposited on a substrate an applied static electric field can be used to align the chopped fibers along a preferred direction. In other implementations, standing acoustic or optical waves can be formed at or near the substrate on which the chopped fibers are deposited, and the potential wells of the standing waves can be used to align the chopped fibers that are deposited.

In one implementation, the fiber reinforced film 700 can be used as the backing film in a flexible display. However, the fiber reinforced film 700 also can be used in many other implementations, such as providing thin, strong structures. The fiber reinforced film 700 can include a plurality of layers stacked on top of each other as sheets. However, in other implementations, the fiber reinforced film may include only a single layer.

When implemented as multi-layer film, different layers of the fiber reinforced film 700 can include strong elongated chopped fibers 702 that run along the length of the layer and that are embedded in a matrix of polymer material. For example, a layer reinforced with chopped fibers preferentially aligned along axial direction 704 generally requires greater force to bend in a direction that requires the fibers themselves to bend, while relatively less force is required to bend the layer along an axis parallel to the alignment direction of the chopped fibers. In addition, the density of fibers within a layer affects the strength and stiffness of the layer, where a higher density of fibers generally results in a higher strength and higher stiffness layer.

The thickness of each layer of a multi-layer film, or the thickness of an individual layer film, can be less than about 50 μm in some implementations. In some implementations, the thickness of each layer can be less than about 45 μm. In some implementations, the thickness of each layer can be less than about 30 μm. In some implementations, the thickness of each layer can be less than about 25 μm. In some implementations, the thickness of each layer can be less than about 20 μm. In some implementations, the height of each chopped fiber in a direction normal to the plane of its layer (e.g., the diameter of a fiber having a circular cross-section) can be less than 30 μm.

In some implementations, the height of each fiber in a direction normal to the plane of its layer (e.g., the diameter of a fiber having a circular cross-section) can be less than 20 μm. In some implementations, the height of each chopped fiber in a direction normal to the plane of its layer (e.g., the diameter of a fiber having a circular cross-section) can be less than 12 μm. In some implementations, the height of each chopped fiber in a direction normal to the plane of its layer (e.g., the diameter of a fiber having a circular cross-section) can be less than 8 μm.

To achieve a thin film 700 reinforced with preferentially oriented chopped fibers 702, the layers of the fiber reinforced film 700 can be created such that the probability of overlap between neighboring individual fibers is low (e.g., less than 0.1, meaning that fewer than one of 10 fibers overlaps with a neighboring fiber). Although it is desirable to have each of the chopped fibers 702 within a layer to be perfectly parallel to other fibers 702 within the layer, and in most cases, closely spaced to each other to maximize strength, for thin sheets with small-diameter fibers manufacturing techniques may result in a few fibers that overlap each other in a direction normal to the plane of the layer, and overlapping fibers may be more prevalent in the case of a film reinforced with chopped fibers 702 than in a film reinforced with elongated fibers that individually span the film.

However, the greater density of overlapping fibers in a film of chopped fibers than in a film of long fibers that span the film may be acceptable in some implementations if the manufacturing costs of a chopped fiber reinforced film is sufficiently less than that of a film reinforced with longer fibers that span the film.

A backing film having one or more layers of monolayer preferentially aligned fibers can be used to provide strength and protection to a foldable display.

Figure 8:
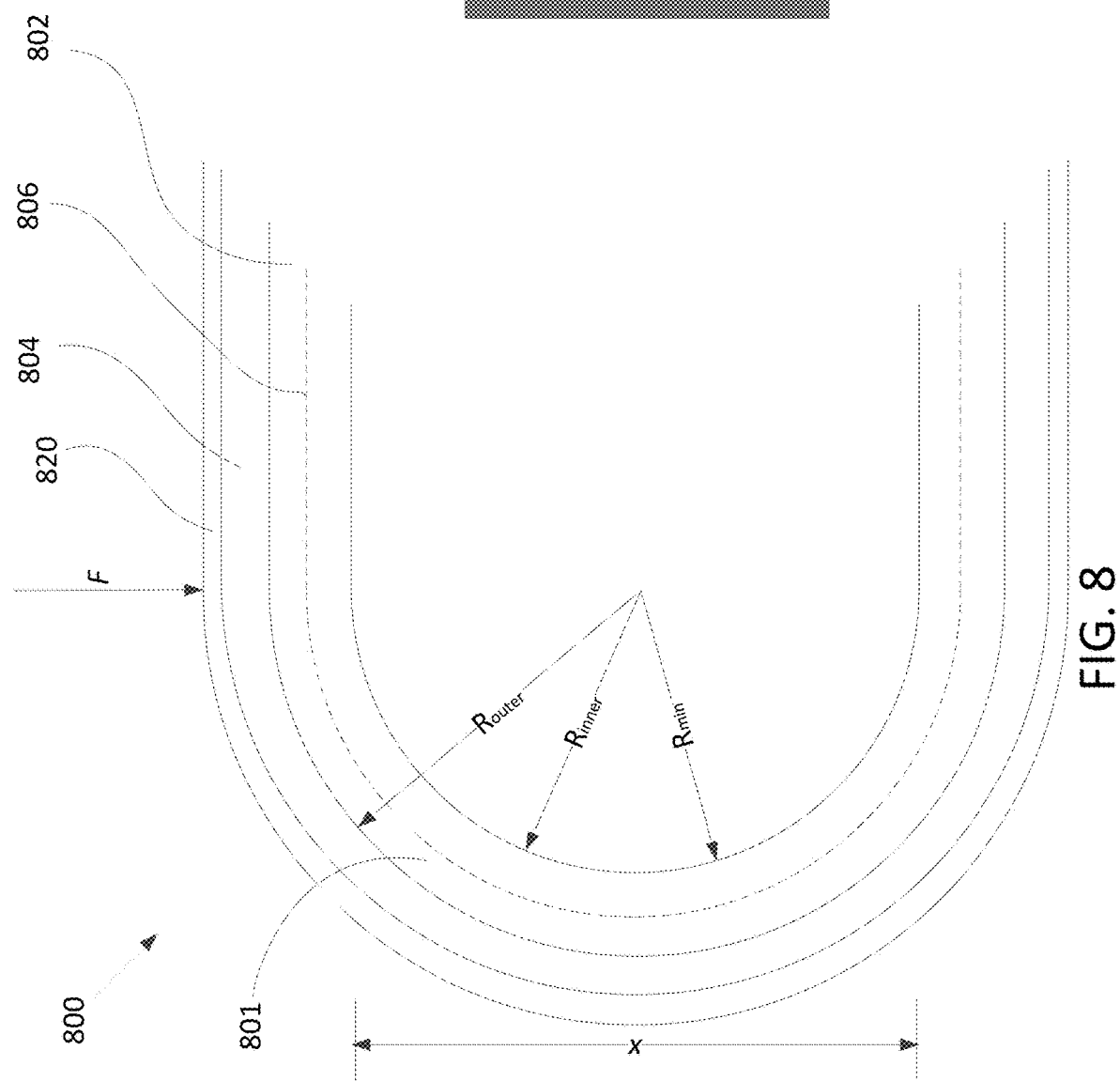
FIG. 8 is a schematic diagram of a fold-in foldable display having a bendable section that is bent around a minimum radius, $R_{min}$.

FIG. 8 is a schematic diagram of a foldable display 800 having a bendable section 801 (the curved portion shown in FIG. 8) that is bent around a minimum radius, Renin. The foldable display 800 can include a display layer 802 that includes components (e.g., OLED layers, TFT layers, touch screen layers, polarizing layers, encapsulation layers, etc.) that generate images on the display (emitted from the side of the display that faces toward the inside of the bend) and that protect the image generating layers, and a bend limit layer 804 that limits the radius at which the foldable display 800 can bend to greater than or equal to the minimum radius, $R_{min}$.

When the display layer 802 is fabricated in a flat configuration, then bending the display layer 802 in the absence of the bend limit layer 804 may cause the bendable section to assume a radius less than the minimum radius, $R_{min}$ and induce excessive strain within the display layer 802. For example, compressive strain will be induced along the inner radius of the bend, $R_{inner}$, and tensile strain will be induced along the outer radius of the bend, $R_{outer}$. The display layer 802 can be approximately characterized by a plane at which no strain is induced when the display layer 802 is bent. This plane is referred to herein as the "neutral plane" 806. If the stack of materials within the layer 802 is symmetrical about a midplane of the layer, then the neutral plane corresponds to the midplane of the layer. However, different material properties (e.g., thickness, Young's modulus, etc.) of different layers within the display layer 802 can cause the neutral plane to be displaced above or below the midplane of the layer 802. The location of the neutral plane within the layer 802, along with the maximum tolerable strain values of the materials within the layer 802, determines the minimum bend radius that can be tolerated without causing damage to components within the layer 802.

The bend limit layer 804 can be attached to the display layer 802 to provide support for the display layer 802 and also can prevent the display layer from being bent around a radius that is smaller than its minimum tolerable bend radius. A monolayer unidirectional fiber reinforced backing film 820 of the device having a layer reinforced with fibers can provide strength and support for the device. The fibers in backing film 820 can have a coefficient of thermal expansion (CTE) that is close to the CTE of the OLED display layer 802, so that the fragile components are not unduly stressed by thermal cycling of the device 800. For example, while many fiber materials have CTE's that are close to zero or even negative, some ceramic fibers can have CTE's on the order of 8 ppm per Kelvin. Use of such fiber materials can improve thermal expansion matching to a wide range of structures, including OLED display layers. In some implementations, the CTE of the fibers can be within about 50% of the CTE of the OLED display layer 820. In some implementations, the CTE of the fibers can be within about 25% of the CTE of the OLED display layer 820. In some implementations, the CTE of the fibers can be within about 10% of the CTE of the OLED display layer 820.

The bend limit layer 804 can be relatively flexible when it bent in radii greater than $R_{min}$ and then can become stiff and inflexible when the radius of the bend approaches, or matches, $R_{min}$. Stiffness can be parameterized by the change in bend radius per unit of applied force that causes the foldable display 800 to bend. For example, in FIG. 8, when the display is folded in half around a 180 degree bend, twice the radius of the bend is shown by the parameter, x, when a force, F, is applied to bend the foldable display. The stiffness of the foldable display 800 then can be parameterized by the derivative, k=dF/dx. The strength of the foldable display can be characterized as the maximum force, F, that the foldable display 800 can withstand before failure of the display occurs.

Figure 9:
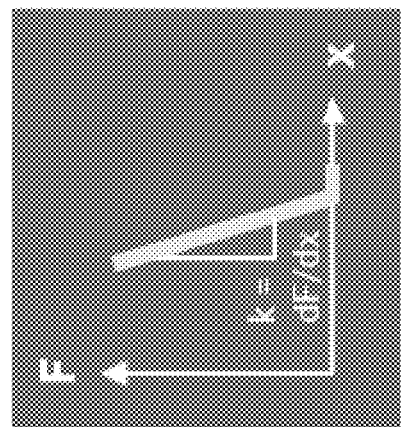
FIG. 9 is a graph showing an example stiffness curve for a foldable display in which the limit radius is reached when the foldable display is folded.

When the foldable display 800 is laid flat in its folded configuration it can be maintained in its folded configuration by the force of gravity on the upper folded portion of the display, such that zero additional force is needed to be applied to the upper folded portion to maintain the foldable display in its flat folded configuration. In this configuration the radius of the bend can be defined as the limit radius, $R_{min}$, i.e., the radius at which the bend limit layer 804 limits the further bending of the foldable display unless additional external force is applied. To bend the foldable display further from this configuration requires additional external force to overcome the stiffness of the bend limit layer. Thus, an example stiffness curve for a foldable display in which the limit radius is reached with the foldable display is folded 180 degrees, showing stiffness as a function of x is shown in FIG. 9.

It can be advantageous to have a foldable display with a stiffness curve that exhibits a relatively sharp increase in stiffness once the limit radius is reached, such that the foldable display can be easily folded into its folded configuration in which $R_{limit}$ is close to $R_{min}$, and then the foldable display will become quite stiff, such that it remains in this configuration despite forces pressing it toward a radius smaller than $R_{limit}$.

Figure 10:
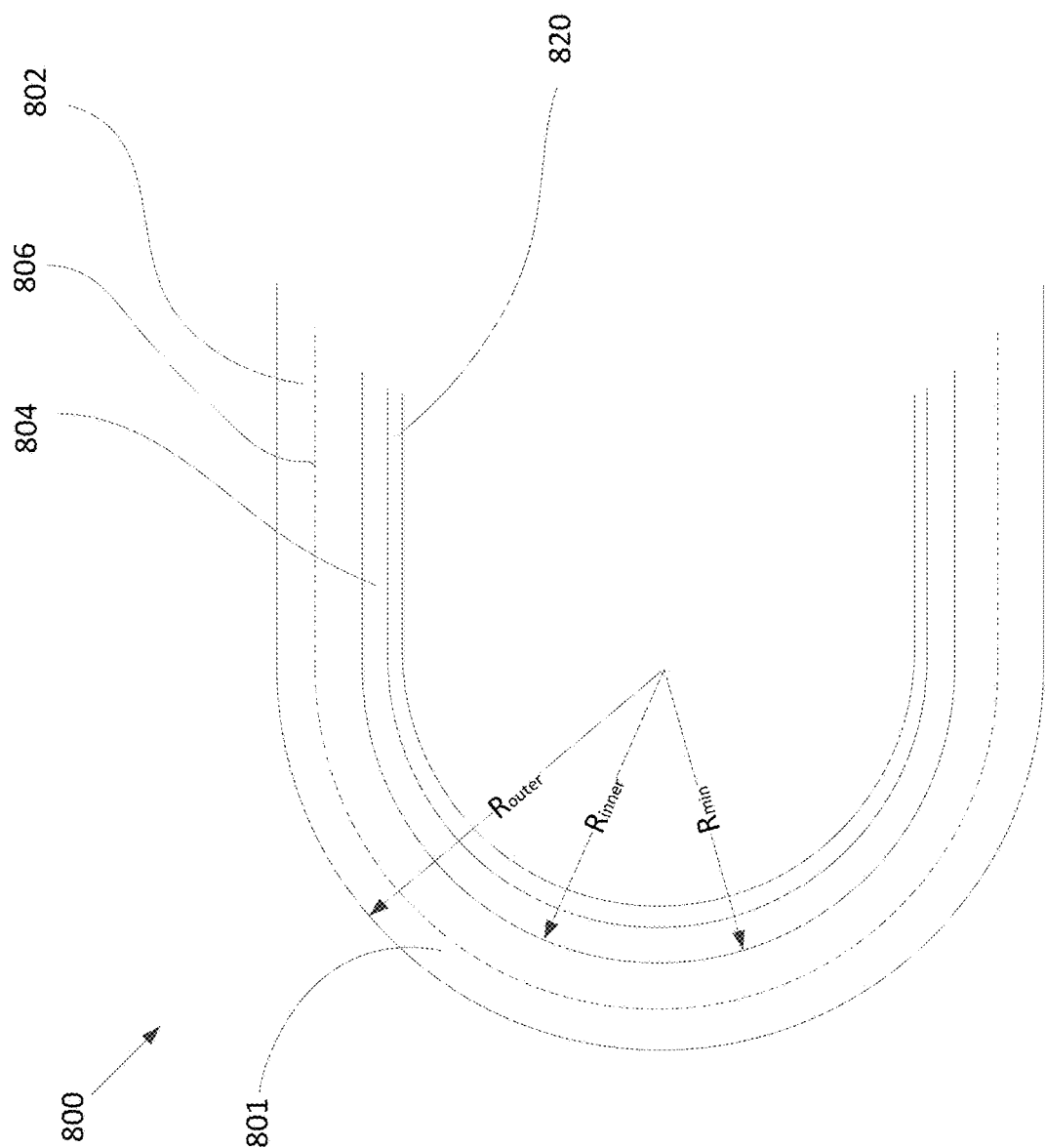
FIG. 10 is a schematic diagram of a fold-out foldable display having a bendable section that is bent around a minimum radius, $R_{min}$.

The bend limit layer 804 is shown on the outside of the bend in FIG. 8, but also can be on the inside of the bend, for example, as shown in FIG. 10, in which case the content displayed by the display is on the outside of the bend and the monolayer unidirectional fiber reinforced backing film 1020 is on the inside of the bend.

Figure 11:
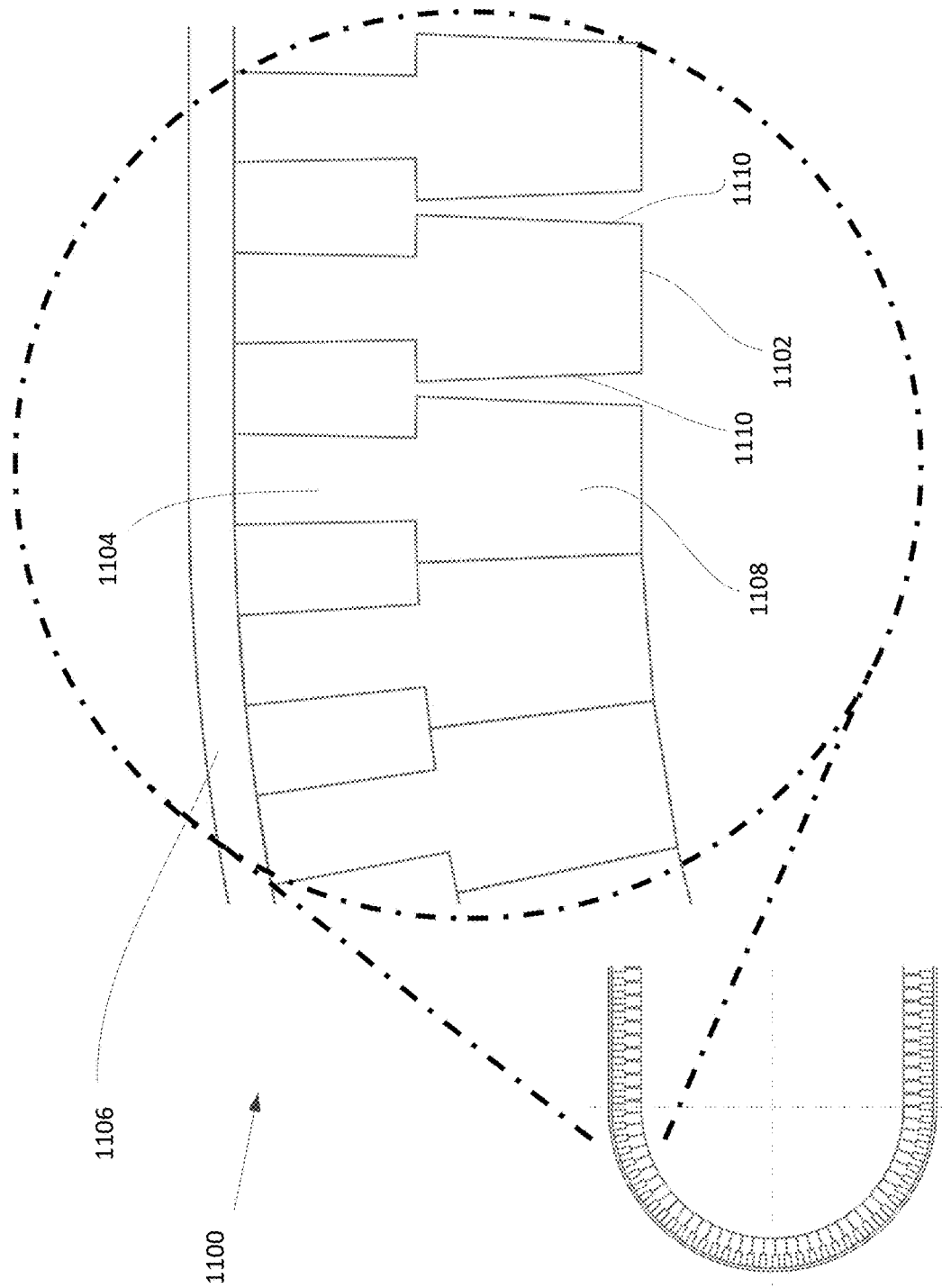
FIG. 11 is a schematic diagram of an example implementation of a bend limit layer.

FIG. 11 is a schematic diagram of an example implementation of a bend limit layer 1100. The bend limit layer 1100 can include a plurality of adjacent segments 1102 that are each separated from neighboring segments for $R > R_{limit}$ and that are in contact with neighboring segments when $R \leq R_{limit}$. Each segment 1102 can have a base portion 1104 that is attached to a thin film 1106 and a head portion 1108 that is wider in a direction parallel to the plane of the bend limit layer 1106 than the base portion 1104. For example, the thin film 1106 can be bent in radii of less than 3 mm. The thin film can be reinforced by elongated fibers that are preferentially aligned along a particular direction, and the fibers can be different lengths in different implementations. The alignment of the fibers in the film can allow the film to have different stiffnesses and strengths when folded in different directions with respect to the preferential direction.

The thin film 1106 can have a thickness that is small compared with the height of the segments 1102 in a direction perpendicular to the thin film 1106. The stiffness of the thin film 1106 is low, so that the bend limit layer 1106 is easily bent for radii $R \geq R_{limit}$. The thin film 1106 can be bent in radii small enough to accommodate the design parameters of the bend limit layer 1100. In one non-limiting example, the thin film 1106 can have a thickness of about 50 μm and when bend into a radius of 2.5 mm can experience a 1% strain. Of course, the thickness of the material can be adjusted to trade off advantages between different parameters, for example, the minimum radius of the thin film can be bent into, the strength of the thin film, and the stiffness of the thin film.

In the example implementation shown in FIG. 11, the bond line between the base portions 1104 and the thin film 1106 covers 50% of one surface of the thin film 1106. In other words, half of the surface of the thin film 1106 is attached to base portions 1104 of adjacent segments 1102, and half of the surface is unattached. Other configurations are also possible, in which the bond line coverage is more or less than 50%. The portion of the thin film 1106 that is bonded to the adjacent segments 1102 is much stiffer than the portions that are not bonded. This increases the stain in the unbonded portions of thin film 1106, and this increase must be accounted for in the materials and geometry of the bend limit layer 1100.

The head portion 1108 of each segment 1102 can have vertical sides 1110 that, when the bend limit film 1106 is flat, are not perfectly perpendicular to the thin film 1106, but rather that are angled toward each other as they extend away from the thin film 1106. Then, when the bend limit layer 1106 is bent into a radius equal to $R_{limit}$, the vertical sides 1110 of adjacent segments 1102 become in intimate contact with, and parallel to, each other, so that they form a rigid, rugged layer of material that has a high stiffness for $R \leq R_{limit}$. Some means of fabricating the head portion 1108 of each segment 1102 may not have perfectly flat sides, but instead have other surface geometries that also allow both faces of adjacent segments 1102 to come into intimate contact with each other, so that they form a rigid, rugged layer of material that has a high stiffness for $R \leq R_{limit}$.

Figure 12:
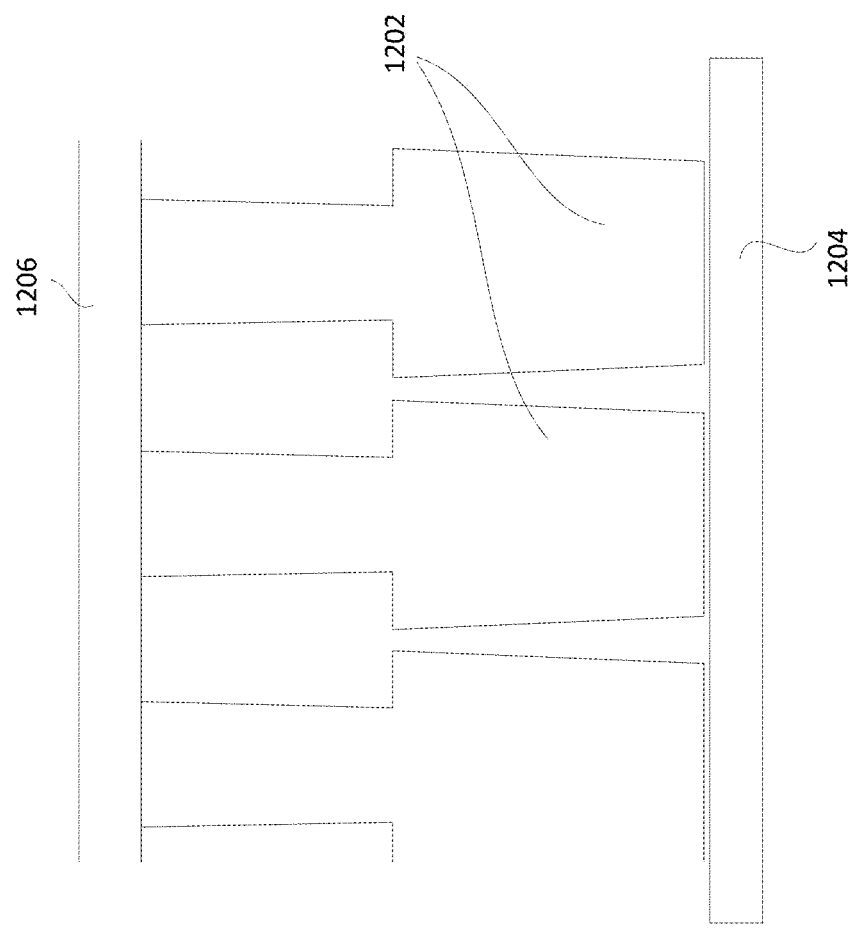
FIG. 12 is a schematic diagram of a plurality of adjacent segments for use in a bend limit film.

The segments 1102 can be formed from a number of different materials including, for example, metals, polymers, glasses, and ceramics. Individual blocks can be molded, machined, drawn (e.g., through a shaped wire) and then attached to the thin film 1106 at the correct spacing. In another implementation, a plurality of adjacent segments 1102 can be formed simultaneously and then attached to the thin film 1106. For example, as shown in FIG. 12, a plurality of adjacent segments 1202 can be formed on a substrate 1204, for example, by a single- or multi-step molding process, and then, after the segments 1202 are bonded to the thin film 1206, the substrate can be broken, dissolved, or otherwise removed from the segments 1202. In another implementation, the plurality of adjacent segments 1202 can be formed on a substrate 1204, for example, by a lithography and etching process, and then, after the segments 1202 are bonded to the thin film 1206, the substrate can be broken, dissolved, or otherwise removed from the segments 1202.

Figure 13:
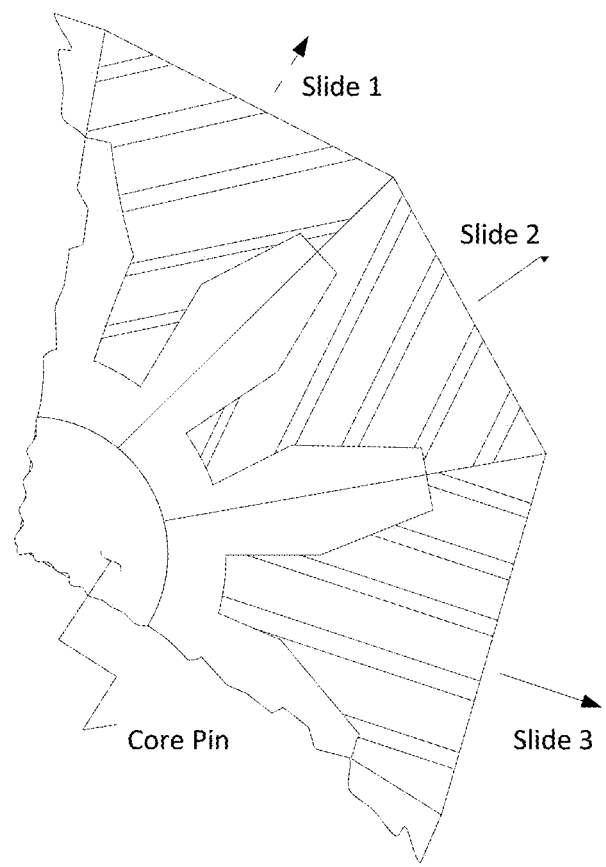
FIG. 13 is a schematic diagram of a rotating mold that can be used in an example molding process for forming the adjacent segments.

FIG. 13 is a schematic diagram of a rotating mold that can be used in an example molding process for forming the adjacent segments 1102. For example, slides 1, 2, 3, etc. can be inserted radially into position with respect to a core pin, and then material can be injected into the voids between the slides and the core pin to simultaneously form the segments 1102 and the thin film 1106. As segments 1102 are formed, the assembly can be rotated counter-clockwise and the slides removed in numerical order to free segments from the counter-clockwise-most position in FIG. 13 while new segments are formed in positions clockwise from the counter-clockwise-most position. By using transparent tooling and an ultra-violet (UV) rapid-curing molding compound, high production throughput can be achieved.

Figure 14:
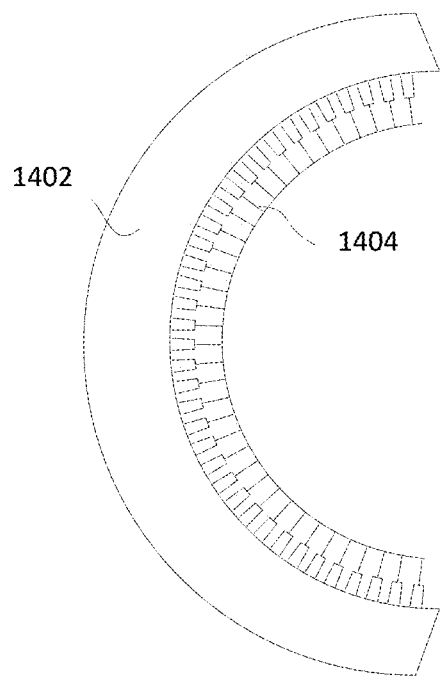
FIG. 14 is a schematic diagram of a mold that can be used for forming adjacent segments of a bend limit layer.

FIG. 14 is a schematic diagram of a mold 1402 that can be used for forming adjacent segments 1102 of a bend limit layer 1404. The shape of the mold 1402 can correspond to the shape of the bend limit layer 1404, when the bend limit layer is in its designed limit radius configuration. Then, the adjacent segments 1102 of the bend limit layer 1404 can be formed as a unified part within the mold 1402, however, with imperfections along the designed boundaries between adjacent segments 1102. The imperfections then can allow the unified part to be cracked along the designed boundaries between the adjacent segments, so that after the bend limit layer 1404 is removed from the mold and flattened the bend limit layer 1404 has the separated adjacent segments 1102 shown in FIG. 11, but when the bend limit layer 1404 is bent to its limit radius, the adjacent segments form strong, rugged contacts to their adjacent segments.

Figure 15:
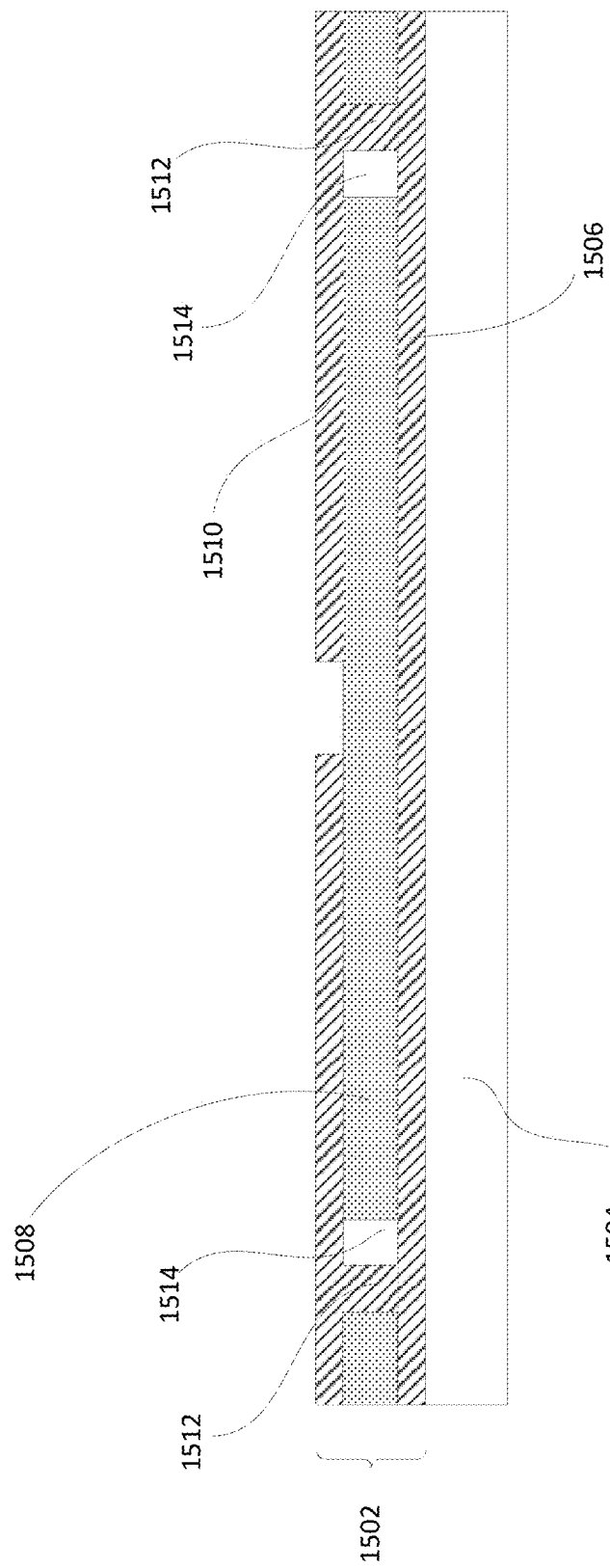
FIG. 15 is a schematic diagram of another implementation of the foldable display, in which a bend limit layer is coupled to a display layer.

FIG. 15 is a schematic diagram of another implementation of the foldable display 1500, in which a bend limit layer 1502 is coupled to a display layer 1504. The bend limit layers 1502 can include a plurality of sublayers. The sublayers can include, for example an outer layer 1506, a middle layer 1508, and an inner layer 1510. The inner layer 1510 can include one or more fingers 1512 that extends outward toward the outer layer 1506 and that, when the bend limit layer 1502 is in a relaxed, un-bent configuration, are each horizontally separated by a gap 1514 in the plane of the layers from a portion of the middle layer 1508 that is closest to the middle of the bend into which the bend limit layer 1502 can be bent. Two fingers 1512 and gaps 1514 are shown in FIG. 15, but any number of fingers and corresponding gaps is possible.

Figure 16:
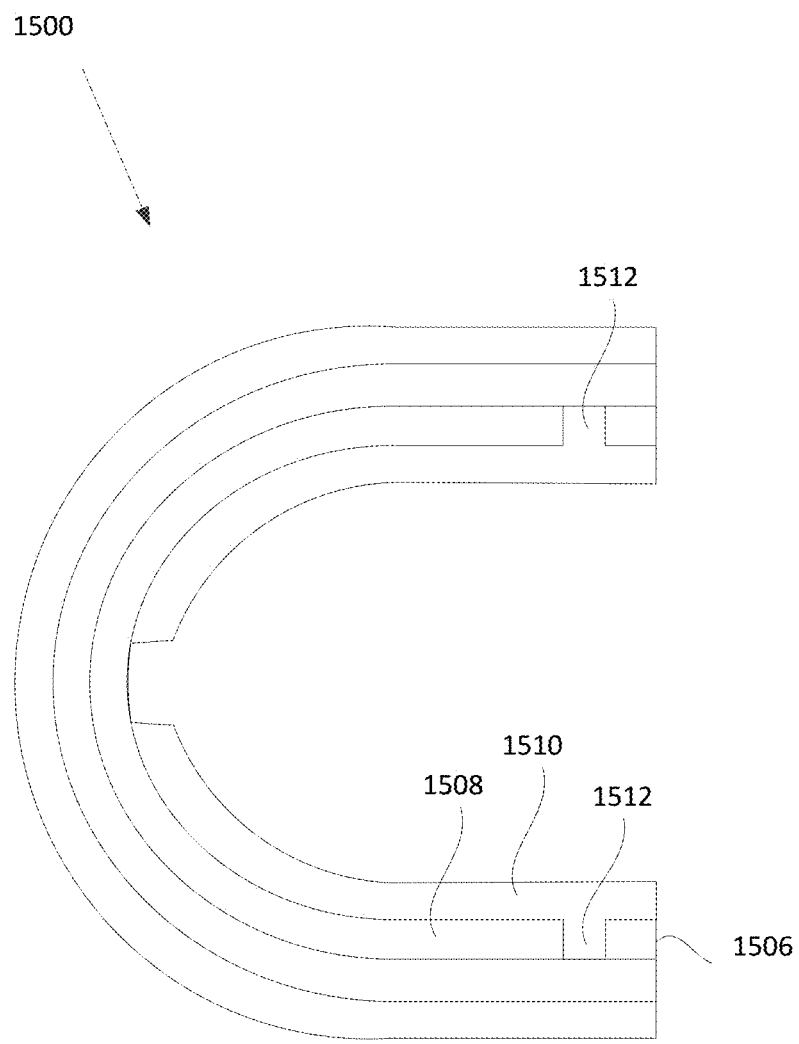
FIG. 16 is a schematic diagram of the foldable display of FIG. 15 when it is in a bent configuration.

FIG. 16 is a schematic diagram of the foldable display 1500 when it is in a bent configuration. As shown in FIG. 16, compressive strain on the inner layer at the apex of the bend due to the bending of the foldable display causes the gaps 1514 between the fingers 1512 of the inner layer and the middle layer to be closed. Thus, the sections of the inner layer 1510 can act as leaves that move across the inner layer in response to the compressive strain and that pull their corresponding fingers with them. When the gaps 1514 are closed, the stiffness of the bend limit layer 1502 increases, so that further bending of the foldable display is restricted.

Figure 17:
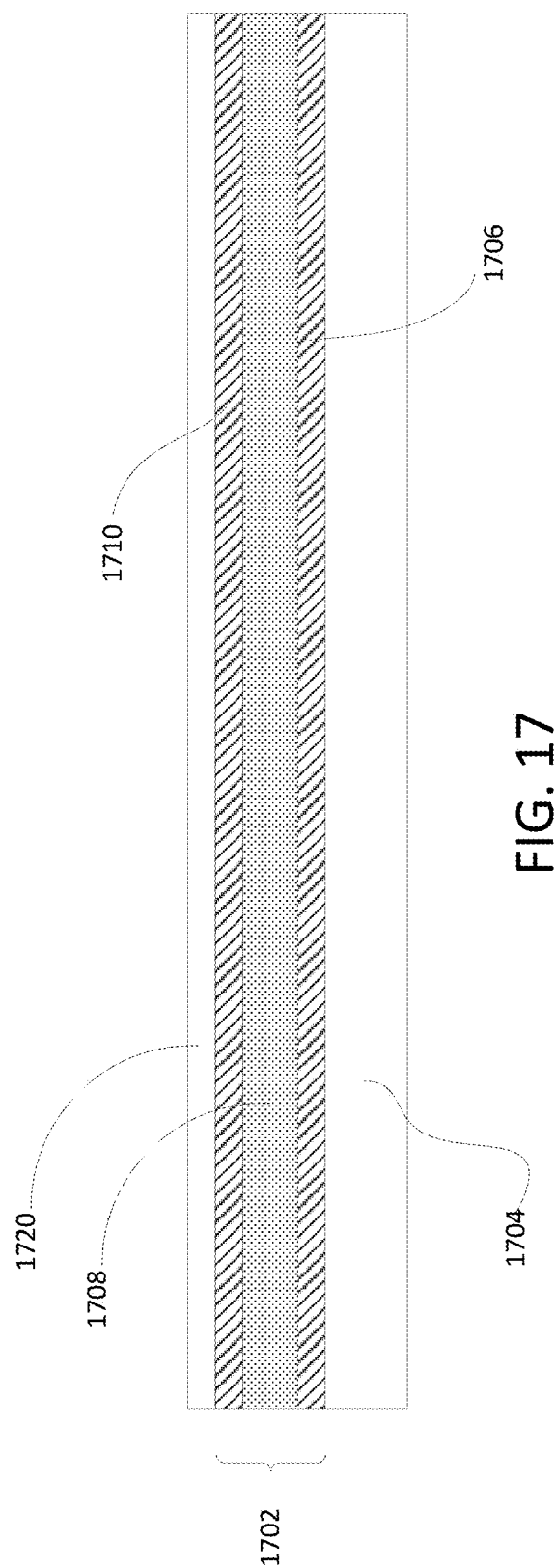
FIG. 17 is a schematic diagram of another implementation of a display in which a bend limit layer is coupled to a display layer.

FIG. 17 is a schematic diagram of another implementation of the display 1700 in which a bend limit layer 1702 is coupled to a display layer 1704 and to a monolayer unidirectional fiber reinforced backing film 1720. The bend limit layer 1702 can include a plurality of sublayers. The sublayers can include, for example, an outer skin layer 1706, a middle layer 1708, and an inner skin layer 1710. The layers can be made of different materials. In one implementation, the inner and outer layers 1710, 1706 can be made of very thin layer of a material with very high elongation (e.g. Nitinol film), and the middle layer 1708 can be made of material whose stiffness changes as a function of the bend radius of the foldable display 1700.

Figure 18:
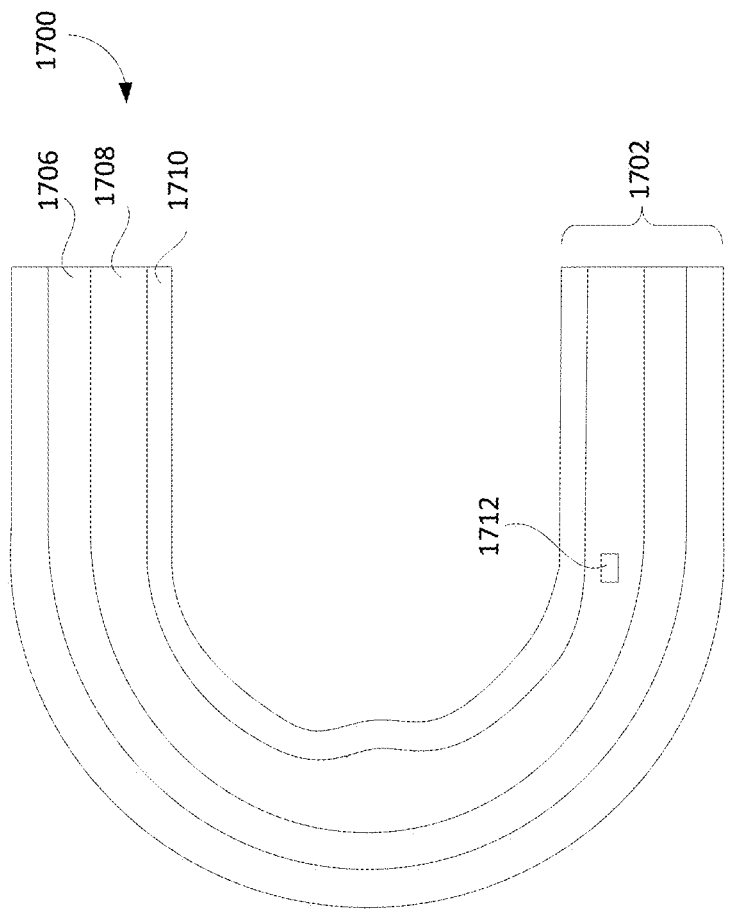
FIG. 18 is a schematic diagram of the foldable display of FIG. 17 when it is in a bent configuration.

FIG. 18 is a schematic diagram of the foldable display 1700 of FIG. 17 when it is in a bent configuration. As shown in FIG.18, compressive strain on the inner layer 1708 due to the bending of the foldable display causes the stiffness of the middle layer 1708 to increase. This can occur in a number of different ways. In one implementation, the compressive strain on the inner layer 1710 and the middle layer 1708 causes the layers 1710, 1708 to deform inward toward the center of the bend, and the deformation of the material can increase the stiffness of the materials in the layers. In another implementation, the compressive strain on the inner layer 1710 and the middle layer 1708 causes a changes of state of an electromechanical device (e.g., a piezoelectric device) 1712 within at least one of the layers 1710, 1708 and a signal due to the change of state can be used to cause a change in the stiffness of the middle layer 1708. For example, an electrical signal from the electromechanical device 1712 in response to the bend-induced strain can trigger an electrical current or a voltage to be applied to the materials in the middle layer, which, in turn, can cause a change of state and stiffness of the material in the middle layer. For example, the material can change from a liquid to a solid in response to the applied current or voltage, or material can be pumped into the bent portion of the middle layer, or the orientation of particles of material can be rearranged in response to the applied current or voltage to increase the stiffness of the bent portion.

Figure 19:
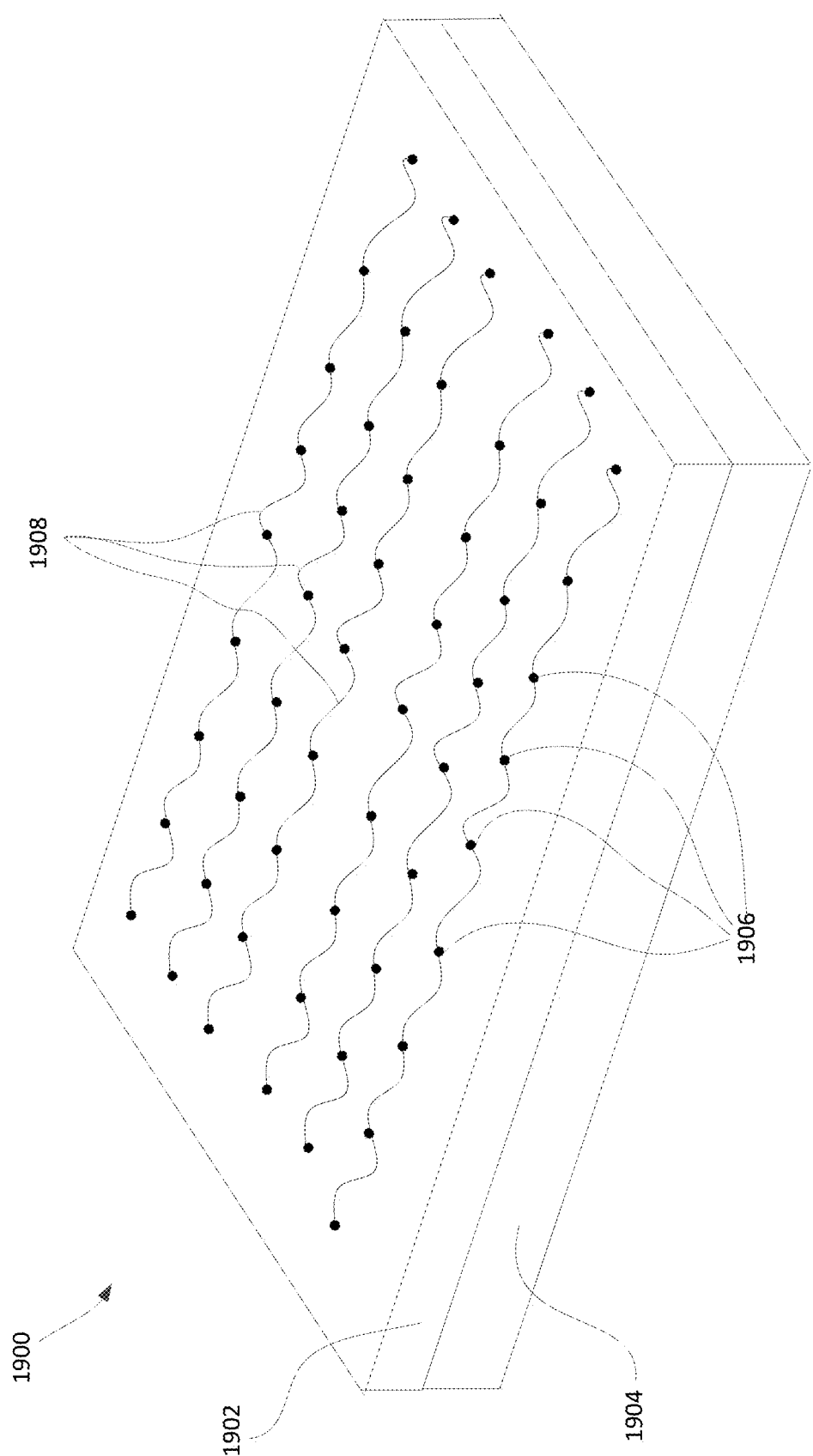
FIG. 19 is a schematic diagram of another implementation of a foldable display in which a bend limit layer is coupled to a display layer.

FIG. 19 is a schematic diagram of another implementation of the foldable display 1900 in which a bend limit layer 1902 is coupled to a display layer 1904. The content of the display can be displayed on a surface of the display that is on the opposite side of the foldable display 1900 from the bend limit layer 1902 (e.g., content side facing down, as shown in FIG. 19). The bend limit layer 1902 can include a plurality of threads or fibers 1908 arranged across the layer 1902 in a plane and that, when the bend limit layer 1902 is in a flat configuration, are arranged in a serpentine configuration, so that the length of each fibers is longer than the straight end-to-end distance in the plane between the ends of each fiber. The fibers 1908 can be made of strong, low-stretch material, such as, for example, fibers made from glass, Kevlar®, graphite, carbon fiber, ceramics, etc. and can be laid down in a low modulus substrate. For example, the fibers 1908 can be laid down via a spread tow technique in the desired pattern using specialized manufacturing equipment. In some implementations, the fibers 1908 can be pinned at locations 1906 along their lengths to a layer of the foldable display, e.g., to a substrate in the bend limit layer 1902 or to an surface at interface between the bend limit layer 1902 and the display layer 1904. For example, the fibers can be pinned at nodes of the serpentine configuration of the fibers. The pinning can be performed by a number of different techniques. For example, a laser heating process may bond the fibers at the pinning sites to the layer, or the fibers can be mechanically bonded at the sites.

The fibers can limit the bend radius of the foldable display 1900 when the display is bent, when the bend limit layer 1902 is on the outside of the bend and the display layer 1904 is on the inside of the bend, because the fibers can become straight and limit the bend radius of the foldable display when the desired minimum bend radius is reached. In other words, the resistance of the bend limit layer 1902 to tensile strain in the layer is very low while the fibers are unstretched and then becomes high when the fibers are stretched to their full lengths. With the fibers bonded to material in the bend limit layer 1902 at the pinning sites, a sudden increase in stiffness of the bend limit layer occurs when the bending of the bend limit layer 1902 causes the fibers to become straight between adjacent pinning sites 1906.

Figure 20:
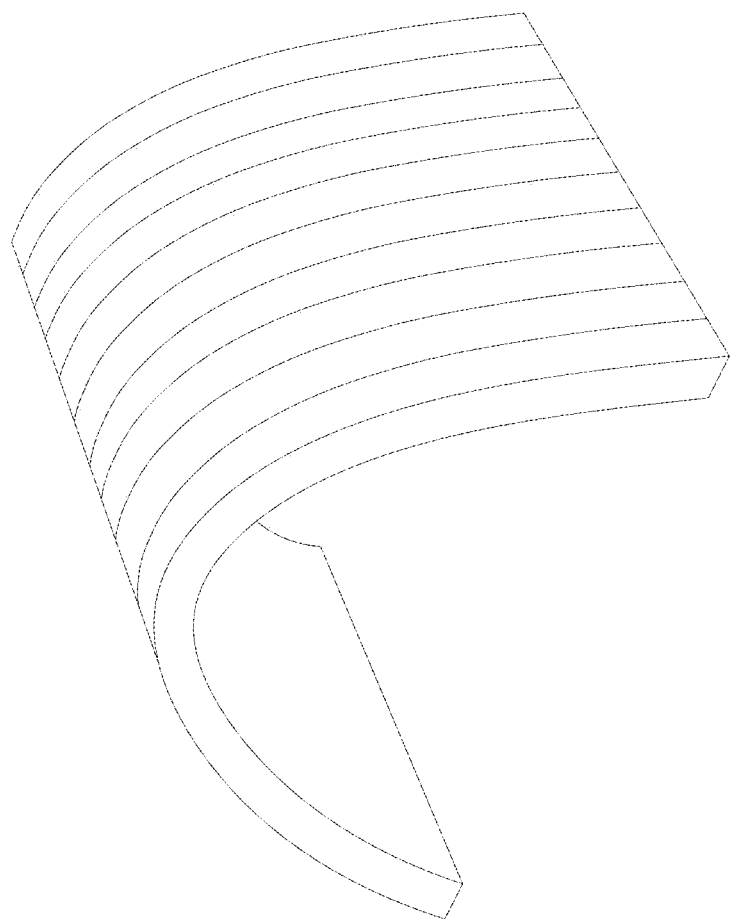
FIG. 20 is a schematic diagram of a foldable display when the display is in a bent configuration.

FIG. 20 is a schematic diagram of the foldable display 1900 when the display is in a bent configuration with the bend limit layer 1902 on the outside of the bend and with the display layer 1904 on the inside of the bend. In this configuration, when the bend limit layer is under tensile strain, the fibers can be become straight in the curved plane of the bend limit layer 1902, and the end-to-end distance, within the curved plane, of each fiber segment between adjacent pinning sites 1906 can be close to, or the same as, the length of each fiber between the adjacent pinning sites 1906. In this configuration the strong, low-stretch fibers resist the tensile strain on the bend limit layer, and thereby limit the bend radius of the foldable display 1900.

Figure 21:
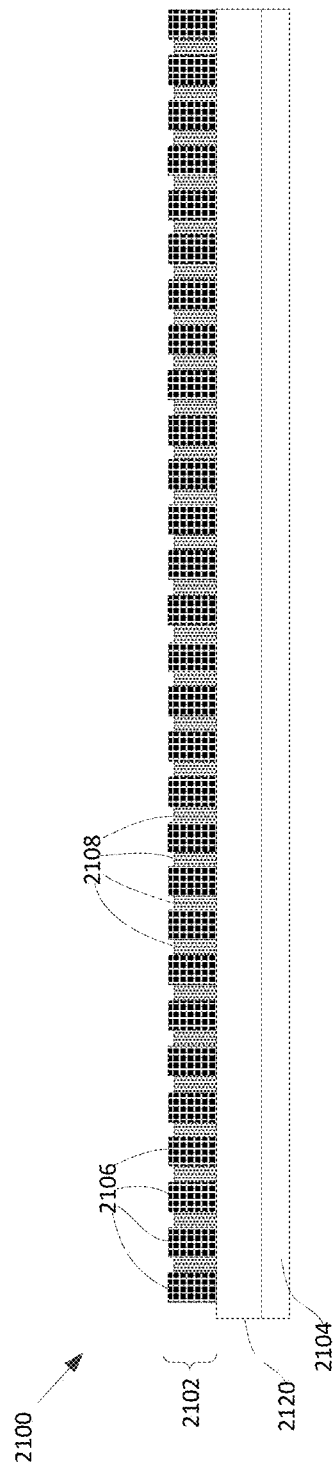
FIG. 21 is a schematic diagram of another implementation of a foldable display in which a bend limit layer is coupled to a display layer.

FIG. 21 is a schematic diagram of another implementation of the foldable display 2100, in which a bend limit layer 2102 and a monolayer unidirectional fiber reinforced backing film 2120 are coupled to a display layer 2104. The bend limit layers 2102 can include a patterned structure of materials that can have a non-linear stiffness response to compressive forces caused by bending of the foldable display 2100.

In one implementation, the patterned structure can include an array of ribs 2106 that extend away from the display layer 2104. As shown in FIG. 21, the ribs 2106 can be rectangular shaped, but other shapes are also possible. The ribs 2106 can be relatively rigid, in that they have a high bulk modulus and a high shear modulus. Therefore, the ribs 2106 retain their shape when the foldable display 2100 is bent. The ribs can include a variety of different rigid materials, including, for example, metals (e.g., aluminum, copper, steel, etc.) ceramic materials, glass materials, etc.

Gaps or trenches 2108 between adjacent ribs 2106 can be partially or fully filled with a second material that has a non-linear stiffness response to compressive forces caused by bending of the foldable display 2100. The material can include a foam (e.g., and open cell foam), a gel, or other material whose bulk modulus changes as a function of the compressive forces on the material.

When the bend limit layer 2102 is in a relaxed, unbent configuration, as shown in FIG. 21, the material in the gaps 2108 between the ribs 2106 can exert a relatively low force on the ribs holding in place in the gaps, for example, because in the unbent configuration the material in the gaps 2108 is in an undeformed state and therefore the material exerts little force due to its compressibility. The distance between adjacent ribs at the distal ends of the ribs (i.e., away from the display layer 2104) can be approximately equal to the distance between adjacent ribs 2106 at the proximate ends of the ribs (i.e. closest to the display layer 2104).

Figure 22:
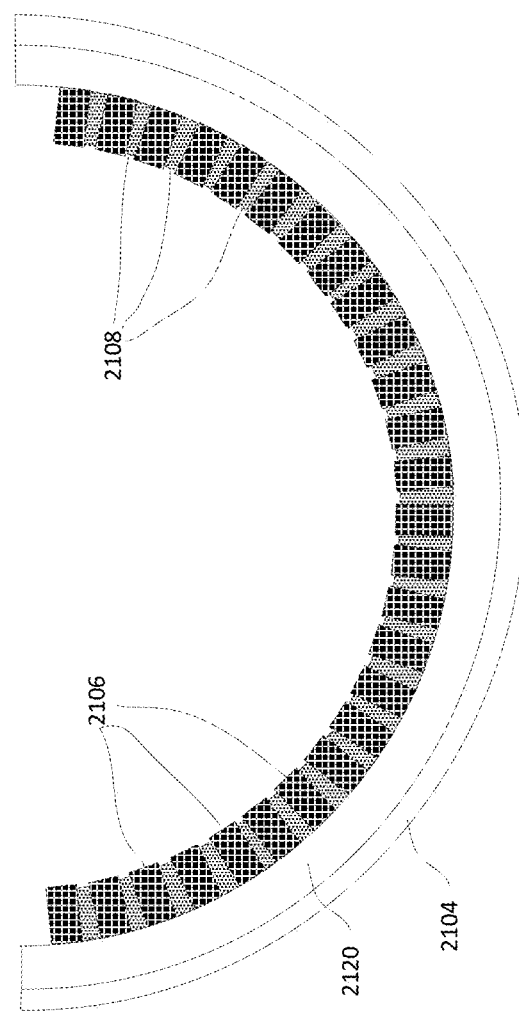
FIG. 22 is a schematic diagram of the foldable display when it is in a bent configuration.

FIG. 22 is a schematic diagram of the foldable display 2100 of FIG. 21 when the display is in a bent configuration. As shown in FIG. 22, compressive strain in the bend limit layer 2102 layer can cause the distance between adjacent ribs 2106 at the proximate ends of the ribs to be less than when the bend limit layer 2102 is in its relaxed, unbent configuration. In addition, because of the bend of the bend limit layer 2102 and the non-zero length of the ribs the distance between adjacent ribs at the distal ends of the ribs 2106 is even shorter when the bend limit layer 2102 is in the bent configuration than when in the unbent configuration. Consequently, the material in the in gaps or trenches 2108 between the ribs 2106 is squeezed when the layer 2102 is bent. The squeezing of the material can cause a sudden increase in the stiffness of the material when the radius of the bend becomes less than a threshold radius. For example, in the case of an open cell foam material in the gaps 2108 between the ribs 2106, air can be squeezed out of the cells when the material is compressed, and when a critical amount of air has been squeezed from the material when the radius reaches the threshold radius, then the stiffness of the material can suddenly increase.

Figure 23A:
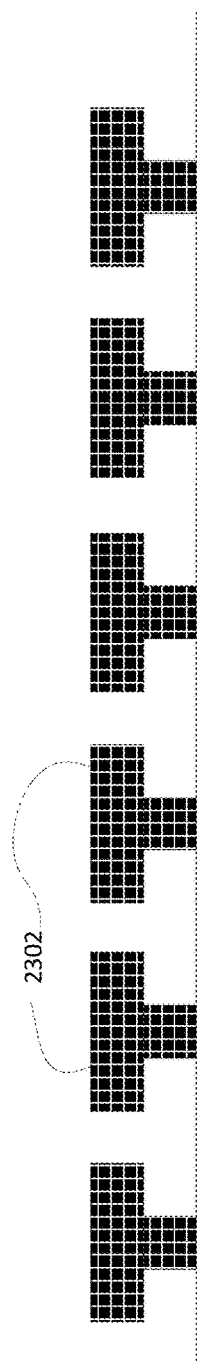
FIGS. 23A, 23B, 23C, 23D are schematic diagrams of details of the foldable display of FIGS. 21 and 22.
Figure 23B:
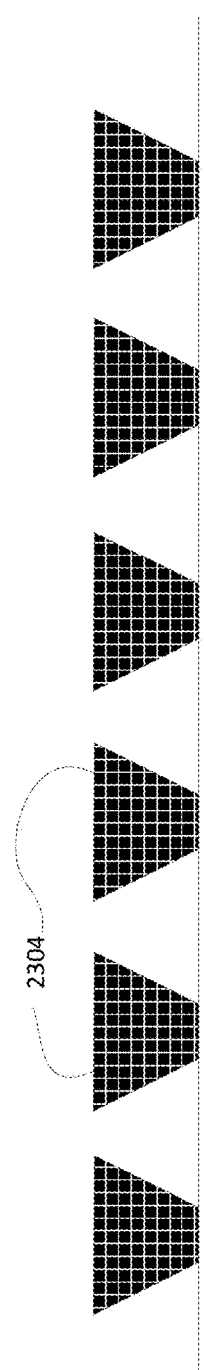
Figure 23C:
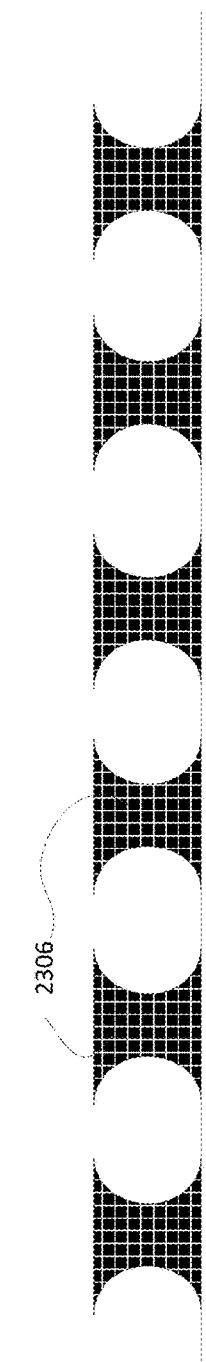
Figure 23D:
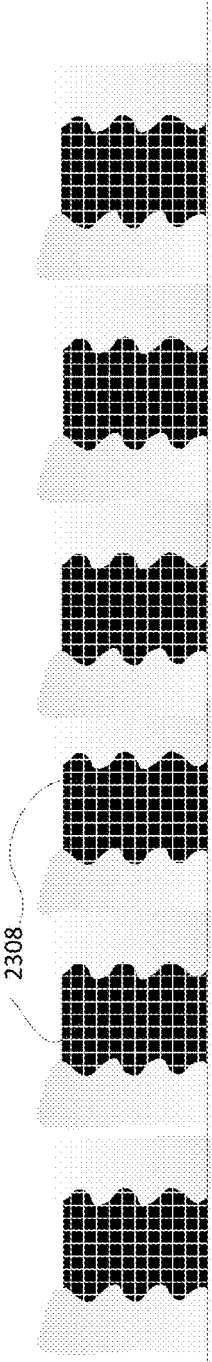

Although rectangular ribs 2106 are illustrated in FIGS. 21 and 22, and rectangular gaps 2108 between the ribs 2106 are shown in FIG. 21, other shapes of both the ribs and the material in the gaps between the ribs are possible. For example, as shown in FIG. 23A, ribs 2302 can be generally T-shaped profile. In another example, as shown in FIG. 23B, ribs 2304 can have a generally trapezoid-shaped profile. In another example, as shown in FIG. 23C, ribs 2306 can have a profile that is narrower in the middle than at the top and the bottom of the ribs. In another example, as shown in FIG. 23D, ribs 2308 can have a custom shaped profile that is configured, in conjunction with the type and shape of the material in the gaps between the ribs to accomplish a desired stiffness vs. bend radius response.

Figure 24A:
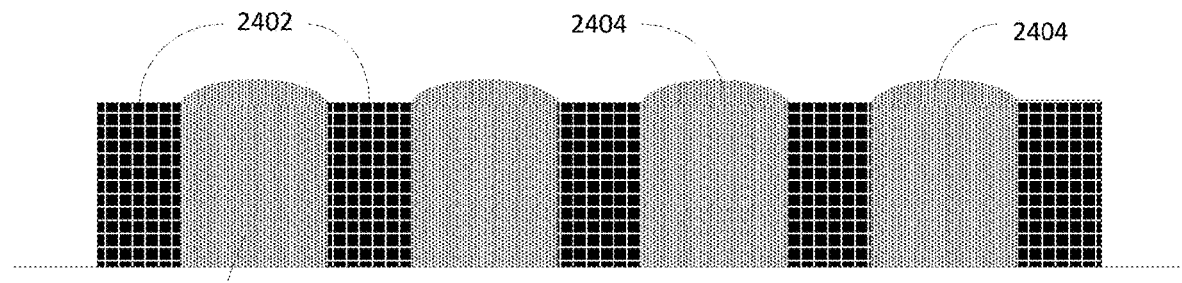
FIGS. 24A, 24B, 24C, and 24D are schematic diagrams of details of the foldable display of FIGS. 21 and 22.
Figure 24B:
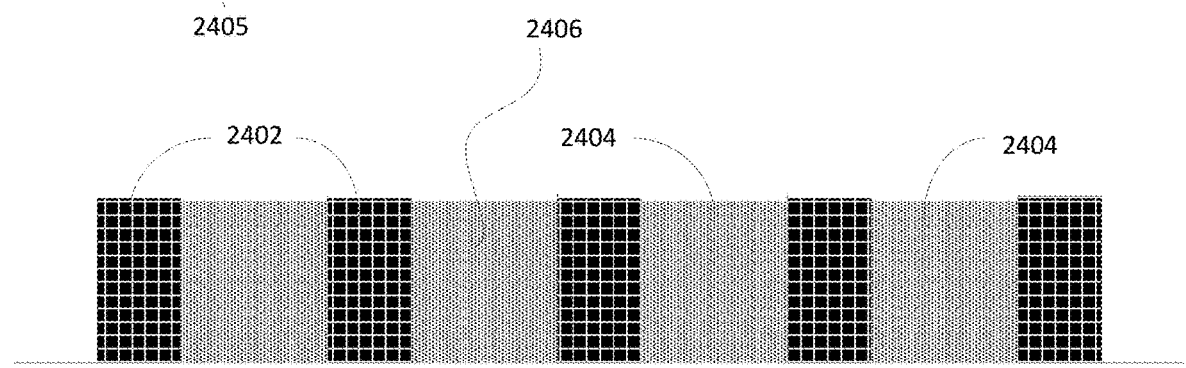
Figure 24C:
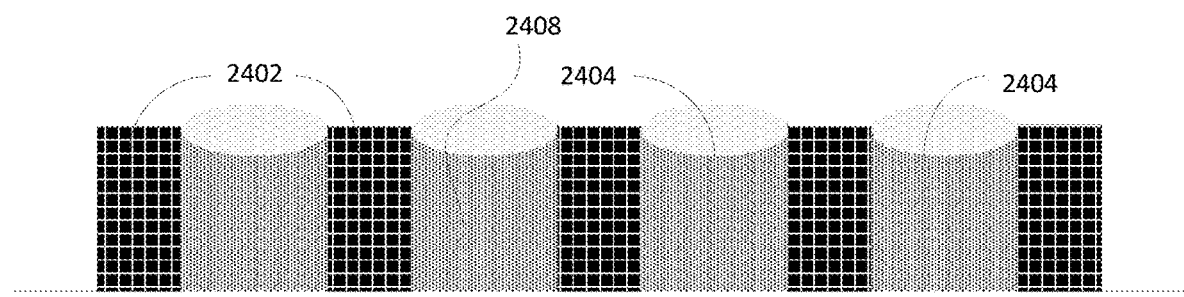
Figure 24D:
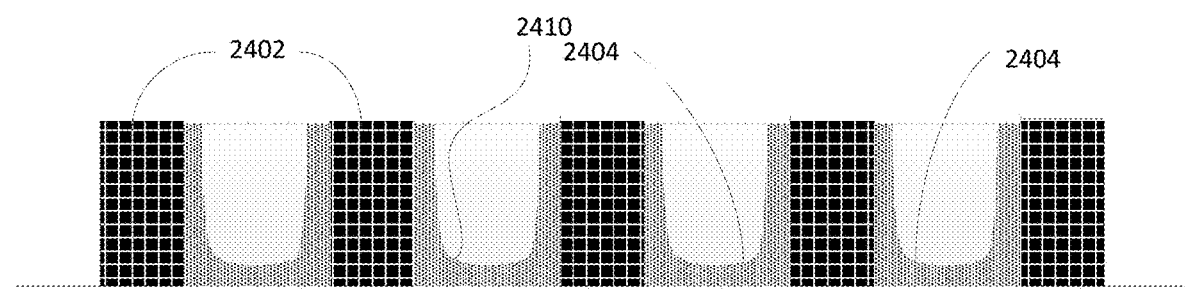

Correspondingly, the shape of the materials in the gaps between the ribs, which materials have a non-linear stiffness response to the radius of curvature of the bend limit film, can have different shapes. For example, FIGS. 24A, 24B, 24C, and 24D show rectangular gaps between rectangular ribs 2402, but with the materials in the gaps having different shapes in the different figures. For example, as shown in FIG. 24A, the rectangular gaps can be filled with non-linear stiffness response material 2405 that bulges above the tops of the gaps when the bend limit layer is in its relaxed configuration. In another example, as shown in FIG. 24B, the rectangular gaps can be filled with non-linear stiffness response material 2406 that precisely fills the rectangular gaps when the bend limit layer is in its relaxed configuration. In another example, as shown in FIG. 24C, the rectangular gaps can be filled with non-linear stiffness response material 2408 that descends below the tops of the gaps when the bend limit layer is in its relaxed configuration. In another example, as shown in FIG. 24D, the rectangular gaps can be filled with non-linear stiffness response material 2410 along the sides and bottom of the gaps, but not on in the central portion of the gaps. The type and shape of the material in the gaps between the ribs can be selected to accomplish a desired stiffness response to the bend radius response of the bend limit layer.

Figure 25:
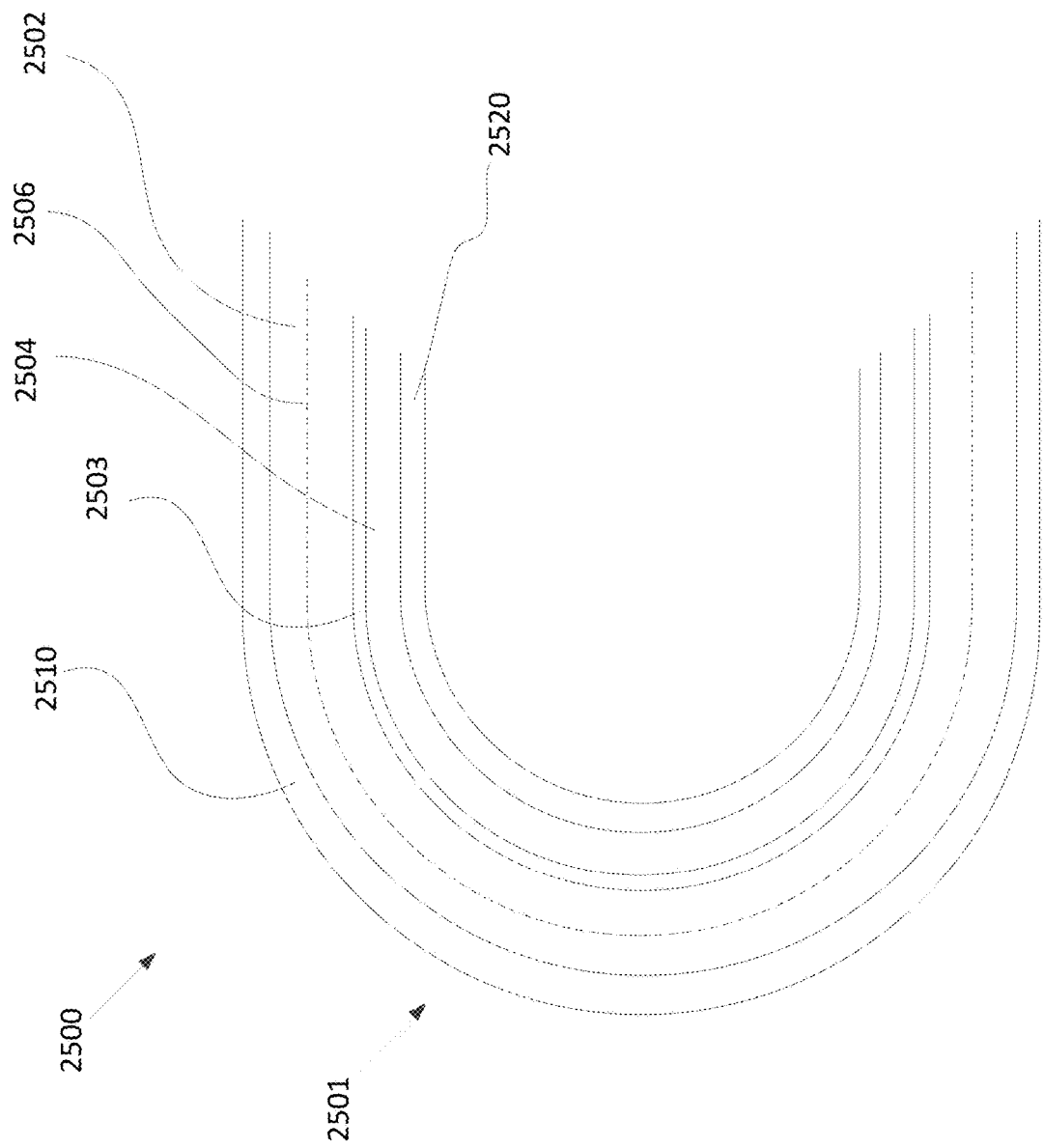
FIG. 25 is a schematic diagram of a foldable display having a bendable section that is bent around a minimum radius, $R_{min}$.

FIG. 25 is a schematic diagram of a foldable display 2500 having a bendable section 2501) that is bent around a minimum radius, $R_{min}$. The display 2500 can also include one or more straight or non-bendable sections. The foldable display 2500 can include a display layer 2502 that includes components (e.g., OLED layers, TFT layers, touch screen layers, polarizing layers, etc.) that generate images on the foldable display and a bend limit layer 2504 that limits the radius at which the foldable display 2500 can bend to greater than or equal to the minimum radius, $R_{min}$. The bend limit layer 2504 is coupled to the display layer 2502 by a coupling layer 2503. The coupling layer 2503 can include, for example, an adhesive material or a bonding material on respective surfaces that touch the display layer 2502 and the bend limit layer 2504. The display 2500 also includes and a monolayer unidirectional fiber reinforced backing film 2520 coupled to a display layer 2504.

As described above, when the display layer 2502 is fabricated in a flat configuration, bending the display layer 2502 induces compressive strain along the inner radius of the bend, and tensile strain is induced along the outer radius of the bend. It is desirable to keep the neutral plane 2506 of the assembly, at which no stain occurs in response to the bending, at, or close to, the plane in which fragile and sensitive components of the assembly (e.g., TFTs) exist. Thus, the coupling layer 2503 can include low modulus material (e.g., rubber, gel, etc.), so that little strain within the planes of the layers is transmitted between the display layer 2502 and the bend limit layer 2504. In some implementations, the display 2500 can include an additional layer 2510 on the opposite side of the display layer 2502 from the bend limit layer 2504 and that functions to maintain the neutral plane close to its designed location within the display layer 2502 when the bend limit layer 2504 acts to limit the bend radius of the display 2500. For example the additional layer 2510 can have a stiffness that compensates for the effect of the stiffness of the bend limit layer on the position of the neutral plane, so that the neutral plane does not shift from its designed location in the display layer 2502 when the display layer 2502 is coupled to the bend limit layer 2504.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
   a foldable display;
   a bend limit layer coupled to the foldable display, the bend limit layer configured to increase its stiffness non-linearly when the foldable display is bent to a radius of curvature less than a limit radius, the limit radius being less than 10 mm; and
   a backing film coupled to the foldable display, the backing film including:
      a first layer including a monolayer of unidirectional first fibers oriented in a first direction and embedded within the first layer, wherein the first layer has a thickness of less than 25 μm; and
      a second layer bound to the first layer, the second layer including a monolayer of unidirectional second fibers oriented in a second direction and embedded within the second layer, wherein the first layer has a thickness of less than 25 μm, wherein the first direction is nonparallel to the second direction.

2. The computing device of claim 1, wherein the bend limit layer includes a plurality of segments that are attached to a film and that are physically separated from each other when the radius of curvature of the foldable display is greater than the limit radius and that are in physical contact with neighboring segments when the radius of curvature of the foldable display less than or equal to the limit radius.

3. The computing device of claim 1, wherein the bend limit layer includes a plurality low stretch fibers, wherein the fibers are arranged in the bend limit layer, such that when the radius of curvature of the foldable display is greater than the limit radius, the distance between ends of each fiber in a plane of the bend limit layer is less than the length of the fiber, and such that when the radius of curvature of the foldable display is less than or equal to the limit radius, the distance between ends of each fiber in a plane of the bend limit layer is approximately equal to the length of the fiber.

4. The computing device of claim 1, wherein the bend limit layer includes a material whose stiffness changes non-linearly in response to a strain in the material exceeding a threshold value.

5. The computing device of claim 1, wherein the unidirectional first fibers include a ceramic material.

6. The computing device of claim 1,
   wherein the foldable display includes an OLED layer, the OLED layer having a first coefficient of thermal expansion,
   wherein a weighted average coefficient of thermal expansion of the unidirectional first fibers in the first layer is within 25% of the first coefficient of thermal expansion.

7. The computing device of claim 6, wherein the unidirectional first fibers in the first layer include fibers of different materials, the different materials having different coefficients of thermal expansion.

8. The computing device of claim 7, wherein the first fibers in the first layer include ceramic fibers and include carbon fibers.

9. The computing device of claim 6, wherein the weighted average coefficient of thermal expansion of the unidirectional first fibers in the first layer is greater than 7 ppm per Kelvin.

10. The computing device of claim 1, wherein the direction of the first fibers is substantially perpendicular to the direction of the second fibers.

11. The computing device of claim 1, wherein the first fibers and the second fibers have cross-sections that are substantially circular, wherein diameters of the first fibers and of the second fibers are less than about 12 μm.

12. The computing device of claim 11, wherein an average spacing between adjacent unidirectional first fibers is greater than two times the diameter of the first fibers.

13. The computing device of claim 11, wherein an average spacing between adjacent unidirectional first fibers is greater than five times the diameter of the first fibers.

14. The computing device of claim 1, further comprising:
   a third layer bound to the second layer, wherein the second layer is located between the first and third layers, the third layer including unidirectional third fibers embedded within the third layer, wherein the third layer has a thickness of less than 25 μm and wherein a direction of the third fibers is nonparallel to a direction of the second fibers.

15. The computing device of claim 14, wherein the direction of the third fibers is substantially parallel to the direction of the first fibers.

* * * * *